United States Patent
Kadhim et al.

(10) Patent No.: US 12,423,703 B1
(45) Date of Patent: Sep. 23, 2025

(54) REAL TIME FRAUD DETECTION AND INTERVENTION

(71) Applicant: Block, Inc., San Francisco, CA (US)

(72) Inventors: Hashiam Kadhim, Scarborough (CA); Cole Clifford, Stirling (CA)

(73) Assignee: Block, Inc., Oakland, CA (US)

( * ) Notice: Subject to any disclaimer, the term of this patent is extended or adjusted under 35 U.S.C. 154(b) by 190 days.

(21) Appl. No.: 18/045,375

(22) Filed: Oct. 10, 2022

(51) Int. Cl.
*G06Q 20/40* (2012.01)
*G06Q 20/06* (2012.01)

(52) U.S. Cl.
CPC ..... *G06Q 20/4016* (2013.01); *G06Q 20/0655* (2013.01); *G06Q 20/407* (2013.01)

(58) Field of Classification Search
CPC ........... G06Q 20/4016; G06Q 20/0655; G06Q 20/407
USPC ......................................................... 705/44
See application file for complete search history.

(56) References Cited

U.S. PATENT DOCUMENTS

| | | | |
|---|---|---|---|
| 10,489,834 B2 * | 11/2019 | Gupta | H04W 4/14 |
| 2018/0196694 A1 * | 7/2018 | Banerjee | G06F 9/466 |
| 2020/0402058 A1 * | 12/2020 | Zhou | G06Q 20/385 |
| 2022/0108331 A1 * | 4/2022 | Thomson | G06Q 40/02 |

* cited by examiner

*Primary Examiner* — Lindsay M Maguire
(74) *Attorney, Agent, or Firm* — IP Spring

(57) ABSTRACT

In particular embodiments, techniques include a computer-implemented method including monitoring a plurality of real-time streams of content and a plurality of transactions in real-time. A machine-learning model trained to detect fraudulent transaction activity is used to determine that one or more of the real-time streams are associated with fraudulent transaction activity based on input corresponding to the monitored real-time streams and plurality of transactions. A request is received from a user device of a first user to initiate a transaction on behalf of the first user and it is determined that a characteristic of the requested transaction is indicative of a fraudulent transaction associated with the fraudulent transaction activity associated with one or more of the real-time streams. In response, processing of the requested transaction is modified.

16 Claims, 18 Drawing Sheets

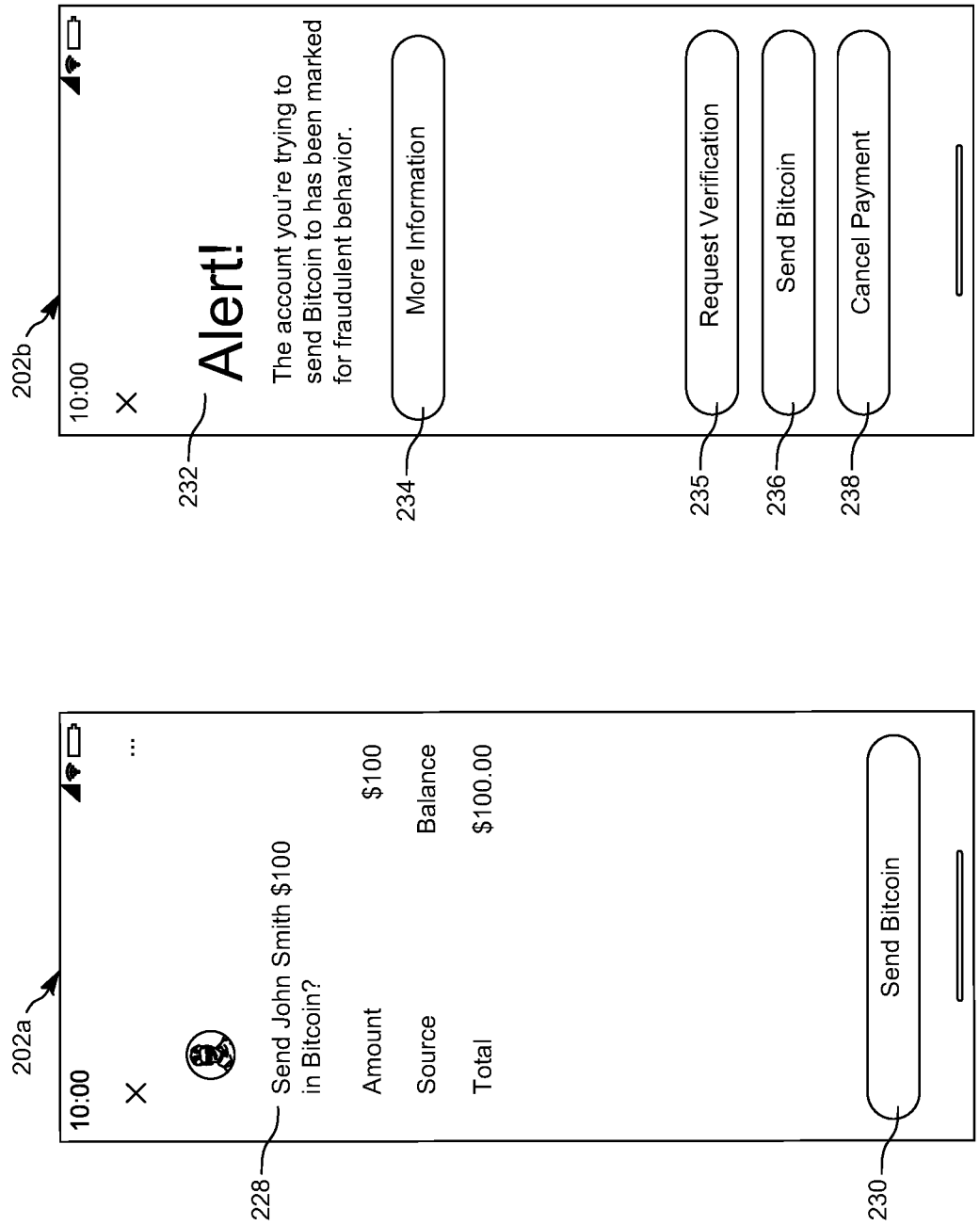

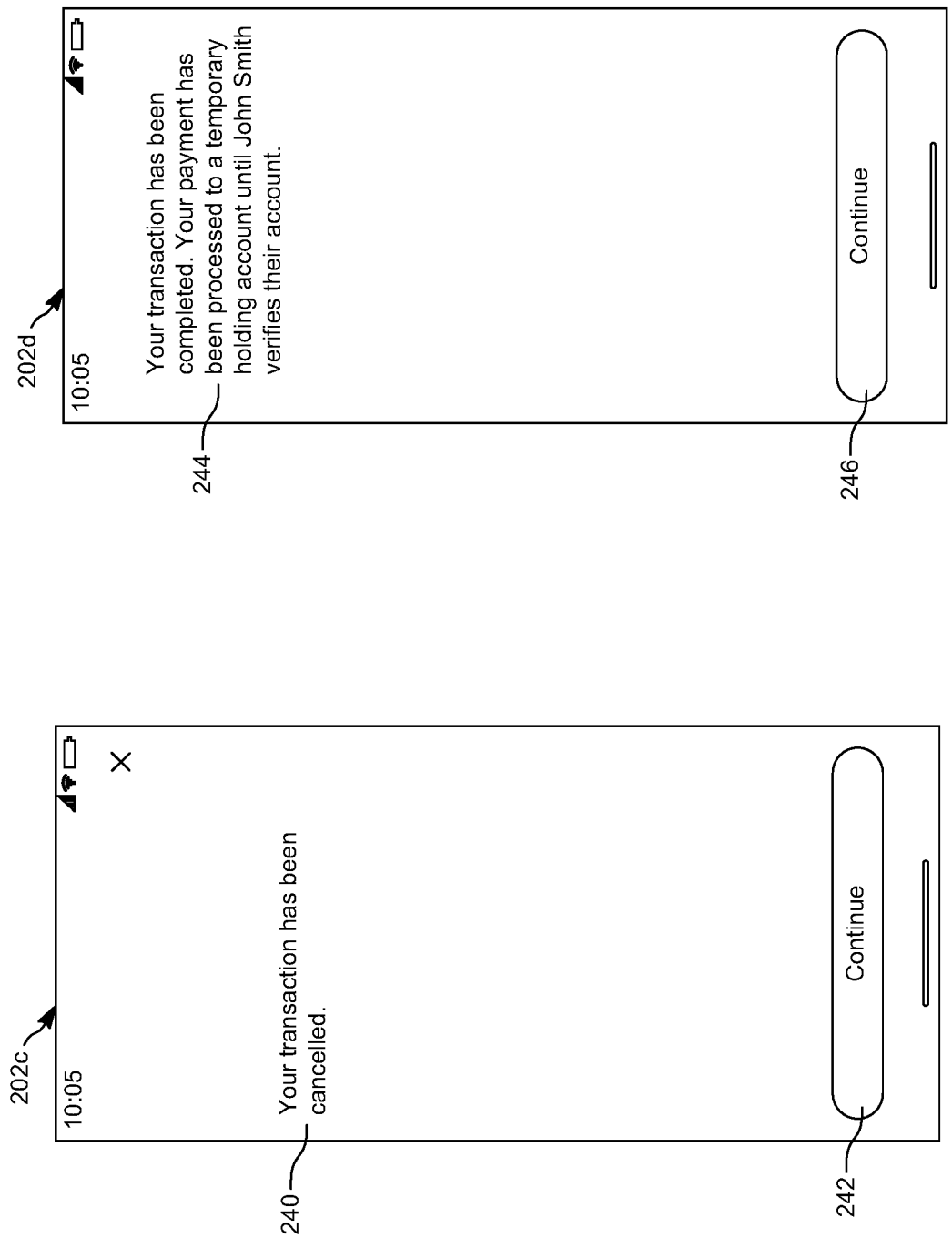

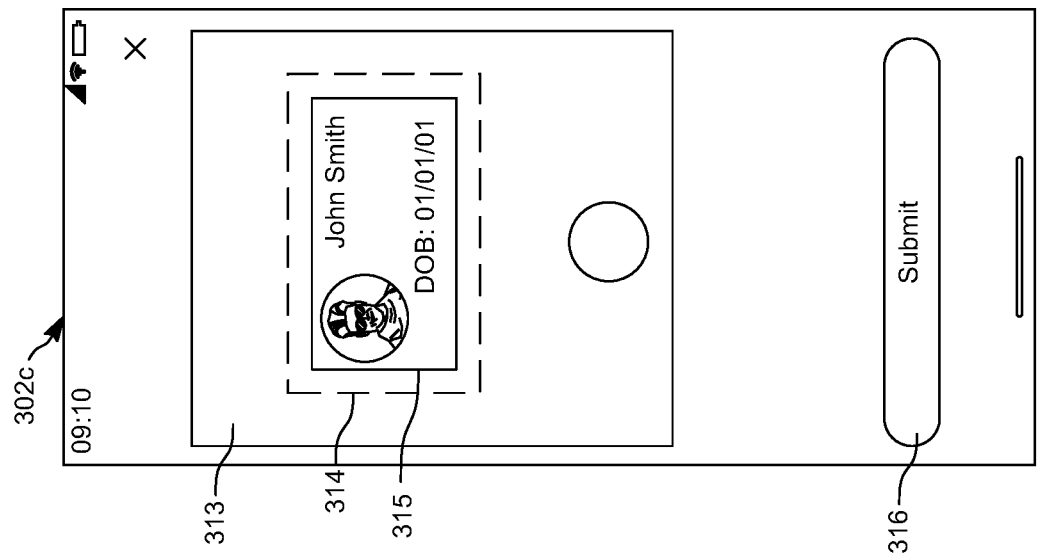
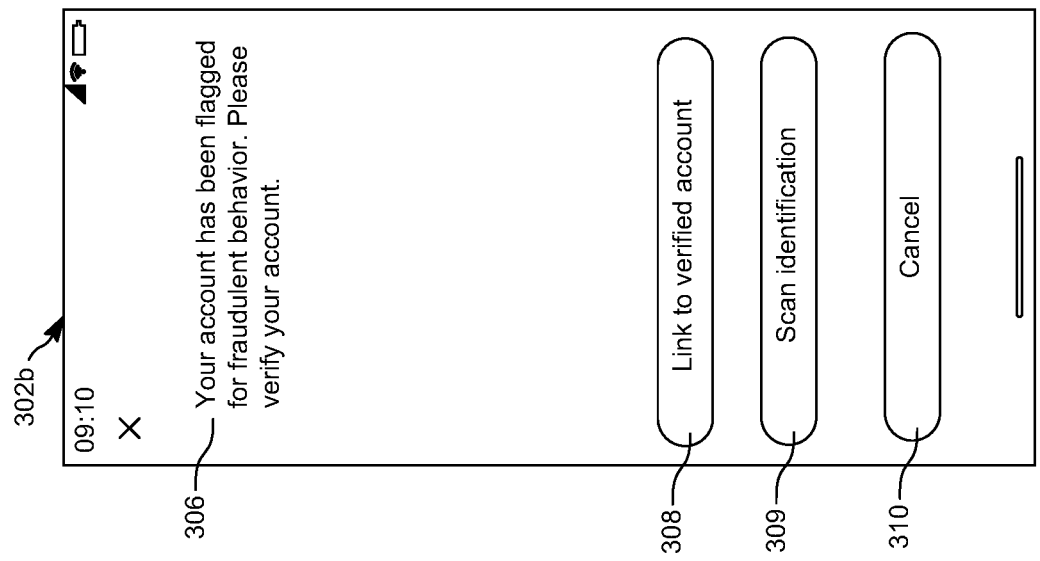
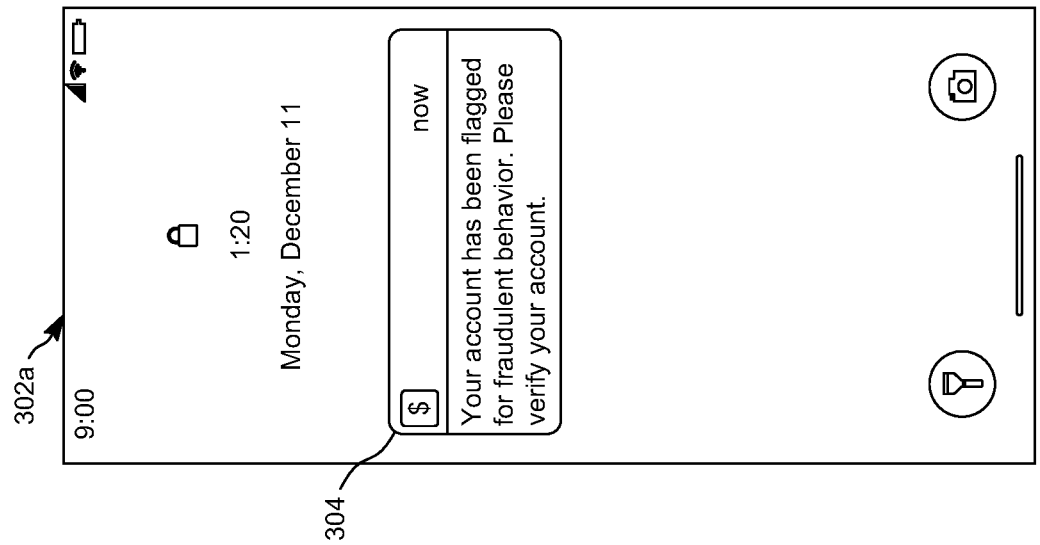
FIG. 3C
FIG. 3B
FIG. 3A

REAL TIME FRAUD DETECTION AND INTERVENTION

TECHNICAL FIELD

Payment service applications, which are downloadable and executable on user devices, enable users to make contactless or remote payments with other users or merchants. Such payment service applications are provided by a payment service and utilize one or more network connections to transmit data among and between user devices to facilitate such payments. Payments can be made in a variety of currencies, including fiat currencies and non-fiat currencies such as cryptocurrencies.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical components or features. Moreover, multiple instances of the same part are designated by a common prefix separated from the instance number by a dash. The figures are not drawn to scale.

FIGS. 2A-2F illustrate example GUIs for providing user interventions in response to detection of potential scam or fraudulent activity according to some embodiments disclosed herein.

FIGS. 3A-3C illustrate example GUIs for verifying a user identity according to some embodiments disclosed herein.

DETAILED DESCRIPTION

Figure 1:
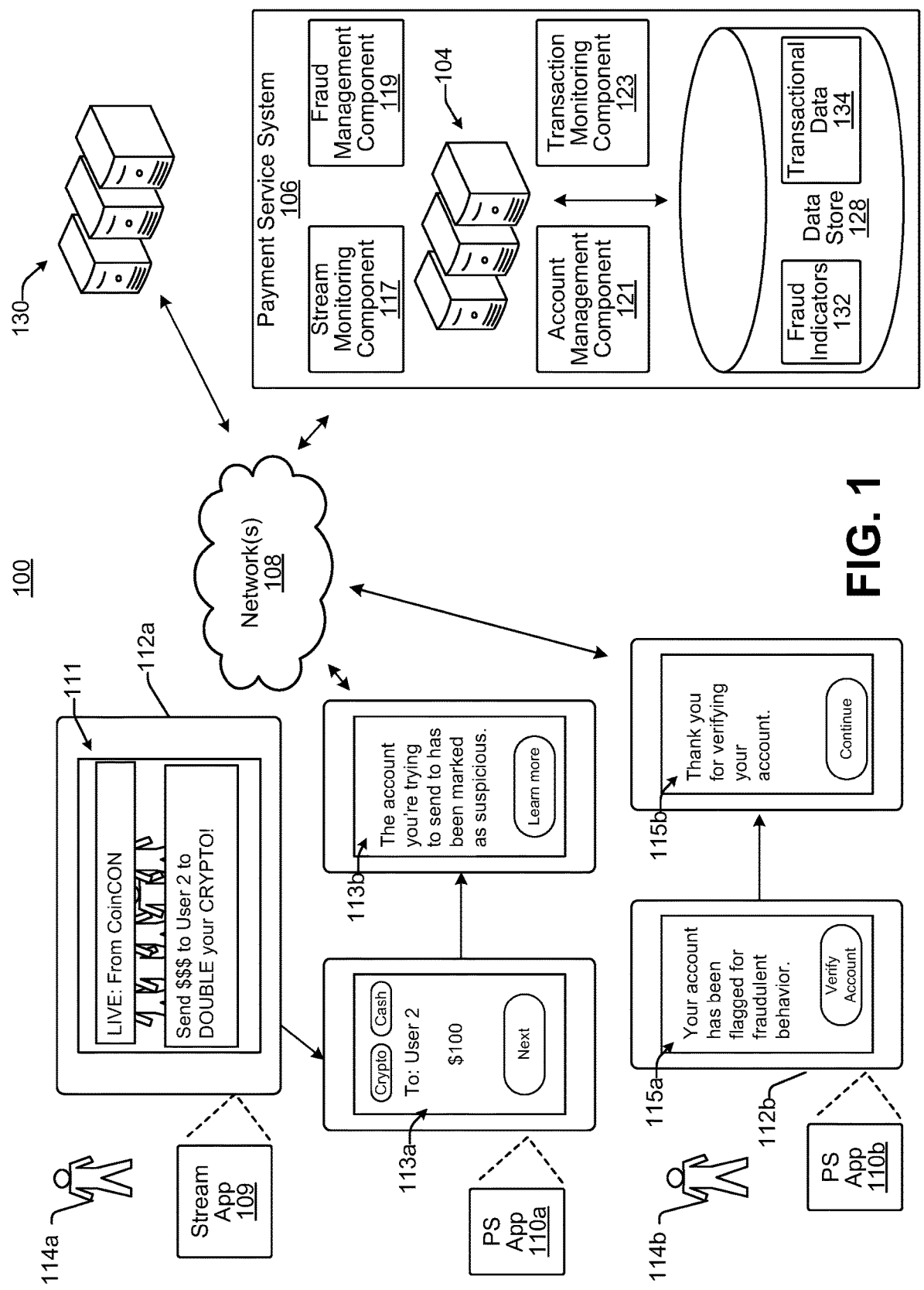
FIG. 1 is an example operating environment for real-time fraud detection and intervention according to some embodiments disclosed herein.

Techniques described herein relate to fraud detection and/or prevention for accounts of a payment service. Fraudsters can pirate genuine content of other users and can make legitimate requests for users of the payment service to perform particular actions using their accounts. In some examples, an action may be a transfer of funds (e.g., cryptocurrency) into a digital wallet or account associated with a fraudster. Techniques described herein relate to utilizing trained machine-learning model(s) for detecting the presence of pirated content in real-time and intercepting, or otherwise interrupting, transfers to digital wallet addresses or accounts expected to be associated with fraudsters. That is, techniques described herein leverage machine-learning model(s) to identify pirated content and flag transactions that are likely to be directed to fraudsters. Such flagged transactions can be intercepted, interrupted, prohibited, trigger an additional or alternative verification process, or the like. As such, techniques described herein can prevent or mitigate fraud associated with a payment service.

One prevalent type of fraud perpetrated among the users of peer-to-peer payment services, including the cryptocurrency user community, involves a fraudulent user (e.g., a "scammer") capitalizing on the excitement surrounding in-person conferences and other events. Genuine users often livestream their experiences at these events on popular video hosting and livestreaming services. A scammer can pirate the genuine user's broadcast, masquerading as the genuine user and misrepresenting the content of the pirated broadcast and being genuinely provided by the scammer. As part of the scammer's pirated broadcast, they provide an enticing offer that requests users who wish to participate to transfer some amount of currency, such as a particular cryptocurrency, into a designated digital wallet with the promise of some amount of instant return such as doubling the amount transferred in. The scammer trades on the goodwill and trust of the genuine user's name and presence within the community to entice victims to participate in the scam.

To reduce the victimization of unsophisticated users, techniques can be used to detect the presence of the pirated content, including "live" broadcasts, and/or intercept, interrupt, pause, etc. transfers to digital wallet addresses or accounts expected to be associated with scams. In an example, a variety of automated tools can be used to detect pirated or unauthorized re-use of content. In some examples, the payment service may monitor suspected pirated broadcasts by using one or more models trained using machine learning techniques (e.g., machine-learning model(s)) to detect when broadcast digital content is a duplicate, or slightly modified duplicate, of other content. Machine-learning model(s) trained to detect when broadcast digital content is duplicated or, when the duplication is done without permission, "pirated," can be trained on input including digital content and alterations to the digital content often used to trick typical content identification algorithms. In some examples, the input used to train the machine-learning model(s) can include known examples of pirated content. In some examples, the input used to train the machine-learning model(s) can include general content datasets and alternations thereto. In some examples the output of machine-learning models trained to detect when broadcast digital content is duplicated can include a determination for whether the content is duplicated or pirated, an identification of the genuine original content, and, in some examples, a degree of confidence in the determination. Additionally or alternatively, machine-learning model(s) can be trained to monitor user reports relating to the broadcast digital content. As an example, machine-learning model(s) can be trained on input including example user reports associated with known pirated digital content. The output of said machine-learning model(s) can include a determination of whether the broadcast digital content associated with user reports is genuine or whether the broadcast digital content is pirated or inauthentic content. Additionally or alternatively, machine-learning model(s) can be trained to identify content that is likely to be involved in or used to propagate peer-to-peer transaction scams. As an example, certain types of content, such as fundraising appeals, live broadcasts from events, etc., can be used in scams more frequently than other types of content. Machine-learning model(s) can be trained to identify whether input content is one of these types of content.

In some examples, one or more models can be trained using machine learning techniques to identify recipient data associated with a scammer and to associate pirated content with the recipient data associated with the scammer. In some examples, the machine-learning model(s) can be trained using one or more inputs, including but not limited to, content of pirated content, determinations from one or more other machine-learning models trained to evaluate suspected pirated content (e.g., as described above), websites hosting pirated broadcasts, quality of pirated broadcasts, handles of accounts conducting pirated broadcasts, ages of the accounts (e.g., length of time on the payment service), transaction activity associated with the accounts (e.g., recency of transactions, frequency of transactions, volume of transactions, timing of transactions, value of transactions, etc.), numbers of transactions requested to particular recipients in a defined period of time, and others. In some examples, the machine-learning model(s) trained on said inputs can generate output flagging certain recipient data (e.g., digital wallet address, account identifier, etc.), as being affiliated with a known scammer and, in some examples, a related degree of confidence. In some examples, the recipient data identified using the machine-learning model(s) can be associated with content identified as being pirated.

In some examples, one or more models can be trained using machine learning techniques to identify requests from unsuspecting users (e.g., potential victims) as potential scam transactions. As an example, and not by way of limitation, the machine-learning model(s) can flag requests for transactions involving certain recipient data (e.g., digital wallet address, account identifier, etc.) that is affiliated with a known scammer or user identified as a scammer to a suitable degree of confidence and cause actions to be taken to mitigate the potential scam. In some examples, the machine-learning model(s) can be trained using one or more inputs, including but not limited to, recipient identifier, prior transactions, amount of payment, type of payment, geolocations of sender and recipient, time of day, context (e.g., other applications running in the background, such as a streaming application), entry point (e.g., origination of the payment request, whether the payment request came from a first-party location or an external source, etc.), and others. In some examples, the machine-learning model(s) trained on said inputs can generate output identifying requests from unsuspecting users (e.g., potential victims) as potential scam transactions and a level of confidence in the identification. In some examples, the machine-learning models can generate and/or recommend one or more user interventions. In some examples, the payment service identifies requests from unsuspecting users (e.g., potential victims) as potential scam transactions by using provided information, such as certain recipient data (e.g., digital wallet address, account identifier, etc.) that is affiliated with a known scammer or user identified as a scammer to a suitable degree of confidence.

When the trained machine-learning model flags a transaction request as a potential scam, the payment service can activate one or more interventions to interrupt (e.g., pause or stop) the transaction. As an example, the payment service can store the request, but hold on initiating the requested transaction. While holding the transaction, the payment service can provide user interventions to educate the potential victim, provide evidence that the transaction is related to a potential scam, provide techniques to confirm the legitimacy of the transaction, request confirmation that the user would still like to proceed, or the like. Optionally, the payment service can provide an opportunity for the recipient of the payment (e.g., the suspected scammer) to verify their identity or otherwise demonstrate their legitimacy. In some examples, the payment service can continue the transaction (e.g., based on a confirmation of the legitimacy of the transaction, a request from the user to proceed, verification from the recipient of the recipient's identity, etc.) after the transaction is held. That is, after an interruption, the payment service can continue with the transaction. In some examples, for instance, if the degree of confidence indicating that the request is likely to be associated with a scammer, the payment service can stop the transaction (as opposed to pausing or holding the transaction).

Techniques described herein can leverage specially-configured hardware or software components associated with a payment service to offer technical solutions in accordance with the description herein. Techniques described herein may be performed, at least in part, by a payment service application ("payment service app") provided for download by the payment service. The payment service app (or an instance thereof) may be executing on a user device of one or more users, and respective instances of the payment service app may communicate with the payment service to provide functionality described herein. For the purpose of this discussion, operations attributed to the payment service can be performed by a payment service system comprising one or more computing devices and functional components of which are described below.

In some examples, the payment service can detect a potential scam through the analysis of suspected pirated broadcasts and a corresponding number of transactions that follow a pattern of scam victimization behavior. Due to the data-intensive and fast-moving nature of streaming content and digital content fraud, it is generally known to be difficult to detect instances of fraudulent or pirated content. Techniques described herein leverage particular signals and/or machine learning techniques to enable detection of fraudulent or pirated content. The detection of financial scams associated with the pirated content compounds existing challenges, as it is not common practice in conventional technologies to monitor both transaction request data and digital content broadcasts. Techniques described herein further relate to leveraging additional or alternative signals and/or machine learning techniques to enable detection of recipient data likely to be associated with a scammer and/or transactions involving scammers. That is, techniques described herein utilize machine-learning models, specially trained as described herein, to detect instances of fraudulent or pirated content, identify fraudulent transactions, and/or interrupt such transactions to reduce fraud and improve security for the payment service.

Although described as being separate and distinct machine-learning models, this disclosure encompasses multiple machine-learning models coordinated together to identify pirated content, determine whether that pirated content is being used to conduct a peer-to-peer transaction scam, identify recipient data associated with the peer-to-peer transaction scam, and prevent or delay future transactions requested by potential victims of the peer-to-peer transaction scams. As described herein, the input provided to the algorithms or machine-learning models can include the content of pirated broadcasts, the identity of the website hosting the pirated content, the handle of the account responsible for the pirated content, the age of the account, the number of transactions requested within a monitored period of time, and many others as discussed herein. This input, in addition to the input relating to automated detection of the duplication or unauthorized re-use of digital content, can be provided to machine-learning models trained to detect potential scam transactions to determine whether to flag recipient data, or other representations of the suspected scammer, as being affiliated with a known scammer. By collecting and organizing the various content-related and transaction-related information, models, including coordinated machine-learning model systems, can be able to quickly, efficiently, and accurately identify patterns of potential scam transactions in a manner not previously possible when considering individual sources of information alone. That is, by analyzing transaction data in the aggregate (e.g., across multiple users, time periods, etc.), techniques described herein offer improvements conventional techniques that aim to prevent fraud on a per-transaction or per-user basis. In some examples, one or more machine-learning model(s) may combine the inputs from previously described machine-learning models to generate an output identifying a likelihood that a transaction is associated with a scam.

In some examples, by detecting and preventing the execution of fraudulent transactions, the payment service can proactively reduce the unnecessary processing corresponding to fraudulent transactions. As the volume of fraudulent transactions increases, they can reduce a payment service's ability to process legitimate transactions for genuine users. This is especially the case with respect to cryptocurrency transactions. Scammers may perform additional transactions to shift the funds associated with one account to another account thereby increasing the processing associated with fraudulent transactions. The payment service may detect potential fraudulent transactions and interrupt or redirect the transactions to avoid the fraudulent transactions from slowing down the processing system. Additionally, by proactively flagging recipient data or accounts suspected to be associated with a scammer, the payment service may proactively prevent funds from initially being transferred until further verification has been performed. This reduces further unnecessary and wasteful transaction processing related to reversing fraudulent transactions. The payment service may also redirect transactions to an alternate address until further verification is performed. Redirection can have multiple benefits, including avoiding tipping the suspected scammer off to the fact that their scam has been detected because the funds have been partially moved and held up for further processing. Redirection can also ensure that the funds remain in a controlled environment until there is a justified reason for releasing the funds.

In some examples, a user intervention triggered by the detection of a transaction associated with a suspected scammer can involve a request for the scammer to verify their identify. One approach is to request the scammer to provide identity verification data, such as a document to the payment service. Typically, the identity document is verified by a human actor. However, this is time-consuming and can be prone to error. Instead, as described herein, the payment service can use alternate identity verification techniques, including the use of machine-learning models trained to process identify documentation in a manner that maintains the security and privacy of legitimate users. That is, alternative IDV techniques can be triggered based on a determination that a user needs to verify their identity. As an example, once a certain address or account is flagged as potentially being associated with a scammer, the payment service may request the user (e.g., through a notification through a payment service application) to verify their identity. Alternative IDV processes, as described herein, can analyze third-party data obtained via API or SDK integrations (e.g., with social medial information or the like) to determine whether a user is an actual person, verify their identity (i.e., confirm they are who they say they are), and verify that the user is not a fake account or bot. Additionally, alternative IDV processes can convert identity verification data into a format configured to protect the long-term privacy of the user. In particular, the long-term privacy of the user can be protected by converting the document into a file format that automatically restricts the time or number of access events permitted for the identity verification data. Such a file format can be referred to as a "self-destructing" file, as it can render itself inoperable or even delete itself from local and remote storage devices after the time of use or number of access events has been exceed. The self-destructing file format can therefore be a technological enforcement mechanism for privacy policies or promises made by the payment service, for example, using and receiving the identity verification data.

In some examples, the machine-learning model(s) trained to analyze identity verification data for veracity can be trained using documents stored in the self-destructing file in order to protect the mandated protection of the privacy of the users whose identity verification data is being used. The nature of training machine-learning model(s) to identify potential scam transactions may use personal data. As a result, users may be uncomfortable with any of their associated data being used to train a machine-learning model. To address this concern, a self-destructing file format may be used that increases interoperability and data security. The use of a self-destructing file format may allow for different components of the payment service to transfer the file to any necessary recipients to process the data corresponding to the file without risking the comprise of the privacy and security of the user. Moreover, because the self-destructing file format can optionally delete itself under specified conditions, the use of the self-destructing file format can reduce the risk of exposure of personal data and reduce the storage needed to maintain input data for training a machine-learning model.

In some examples, the payment service may proactively flag certain recipient data as associated with potential scam transactions. Certain techniques currently used may be reactive or are too slow to detect fraud in time to interrupt or redirect a transaction. Instead, by using specially-trained machine-learning model(s) and real-time monitoring of digital content and streaming services, the payment service may interrupt potential fraudulent transactions prior to processing the transactions to send funds to a suspected address. The proactive identification of certain addresses may reduce the number of fraudulent transactions. This improves upon the overall user experience by reducing any unnecessary time spent by the user to sort out fraudulent transactions. As described herein, the machine-learning model may use a plurality of different inputs to accurately detect potential scam transactions. The payment service may also alert users of the possibility of performing a transaction with a flagged address. By alerting users, the user may reevaluate whether to perform a transaction.

While techniques described herein relate to certain addresses used a payment service, such techniques can be similarly appliable to any accounts and any service, such as a social networking service, a cryptocurrency service, a non-fungible token service, or the like. Similarly, while techniques described herein relate to enabling, disabling, or otherwise detecting potential scam transactions, such techniques can be similarly applicable to any functionalities including social networking functionalities, cryptocurrency functionalities, non-fungible token functionalities, or the like. That is, techniques described herein are not limited to "payment" service and functionalities.

FIG. 1 is an example operating environment for real-time fraud detection and intervention as discussed herein. The example environment 100 can include a payment service system 106, which can include servers 104 and a datastore 128 that are configured to exchange electronic communications through network(s) 108 with one or more other computing devices. For example, the server(s) 104 or datastore 128 may exchange electronic communications with at least one of a user device 112a associated with first user 114a by way of a payment service app 110a executing on user device 112a or a user device 112b associated with second user 114b by way of a payment service app 110b executing on user device 112b. The payment service app 110a and 110b (shown as PS App 110a and PS App 110b) can each be respective instances of the payment service app provided by a payment service operating the payment service system 106. The payment service can be associated with the payment service system 106 such that operations described as being performed by the payment service can be performed by the payment service system 106.

As described above, the second user 114b may be broadcasting content 111 that can be viewed from a streaming application 109 on other user devices 112, such as user device 112a associated with a first user 114a. In some examples, the content 111 may appear to correspond to a convention or other event, providing the second user 114b with an opportunity to request funds. In some examples, the content 111 may contain a call to action or an activatable link that initiates a transfer of funds in a user interface 113a of the payment service app 110a. As an example, the content 111 may contain a promotion or promise for a first user 114a to materially benefit by engaging in a peer-to-peer transaction with the second user 114b in one or more selected currencies. In the example illustrated in FIG. 1, the content 111 promises that the first user 114a can double the amount of funds sent to the second user 114b using a particular cryptocurrency. As described herein, the content 111, or other contextual information associated with the content 111, may include evidence that the broadcast includes pirated content and that the second user 114a is attempting to perpetuate a scam on the first user 114a. The payment service can include several mechanisms to identify said scam and intervene to prevent the first user 114a from becoming a victim.

The server(s) 104 may store one or more functional components that enable the payment service to perform operations as described herein. For example, the server(s) 104 can include a stream monitoring component 117, a fraud management component 119, an account management component 121, and a transaction monitoring component 123, among other components. Further, the payment service system 106 can access and maintain a datastore 128. In at least one example, and as illustrated, the datastore 128 can store fraud indicators 132 and transactional data 134 associated with one or more accounts of the users 114. The datastore 128 can store additional or alternative data, as described herein. The server(s) 104 can store additional or alternative functional components. Additional details associated with the server(s) 104 and associated functional components are described herein.

In some examples, the stream monitoring component 117 may monitor streams of broadcast digital content on one or more services enabling users to broadcast content via the internet (broadly, "streaming services"). As an example and not by way of limitation, the stream monitoring component 117 may monitor the stream containing content 111 associated with a second user 114b. In some examples, the stream monitoring component 117 may use a machine-learning model to identify particular content or broadcasts that may correspond to a scammer. As an example and not by way of limitation, the machine-learning model may be trained to identify pirated content, such as when a broadcast digital content is a duplicate, or modified duplicate, of other content. As an example, scammers can attempt to circumvent algorithms designed to detect duplicate or pirated content by modifying the content with video or audio filters. In some examples, machine-learning models can be trained to detect these circumvention techniques. In some examples, the input used to train the machine-learning model(s) can include known examples of pirated content. In some examples, the input used to train the machine-learning model(s) can include general content datasets and alternations thereto. In some examples the output of machine-learning models trained to detect when broadcast digital content is duplicated can include a determination for whether the content is duplicated, pirated, or otherwise inauthentically provided, an identification of the genuine original content, and, in some examples, a degree of confidence in the determination.

In some examples, the stream monitoring component 117 may also be configured to monitor user reports relating to broadcast digital content. The stream monitoring component 117 may use machine-learning models trained using input data that associates user reports complaining of pirated content, or event victimization by scams, with known pirated content. The output of said machine-learning model(s) can include a determination of whether the broadcast digital content associated with user reports is pirated content. The stream monitoring component 117 may also use machine-learning models to identify content that is likely to be involved in or used to propagate peer-to-peer transaction scams. As an example, certain types of content, such as fundraising appeals, live broadcasts from events, etc., can be used in scams more frequently than other types of content. In some examples, the stream monitoring component 117 may store fraud indicators 132 derived from the training of the machine-learning models used to monitor streams for pirated content in the datastore 128.

In some examples, the transaction monitoring component 123 may monitor one or more transactions associated with the payment service system 106. In some examples, the transaction monitoring component 123 may use a machine-learning model to analyze the one or more transactions to identify transactions that may correspond to fraudulent behavior, fraudulent transactions, or transactions associated with scams generally. In some examples, the machine-learning model can be trained to analyze transaction data alone to identify fraudulent transactions to potentially be associated with a scammer. In some examples, the transaction monitoring component 123 may analyze the transactional data 134 stored in a datastore 128 to determine whether the one or more transactions correspond to fraudulent behavior or fraudulent transactions. As an example and not by way of limitation, if a series of transactions have been identified to be associated with fraudulent behavior, the machine-learning model may be trained to identify one or more accounts corresponding to the fraudulent behavior. In particular, the transaction monitoring component 123 may determine commonalities associated with the fraudulent behavior. For instance, if five or more transactions exceeding a threshold amount of assets are transferred to accounts with identical or overlapping recipient data (e.g., destination address, personal identifier for the recipient, user registration data) within a predetermined time period, the machine-learning model may identify that recipient data as suspicious. Upon further review (e.g., analyzing account, requesting user verification, etc.) the transaction monitoring component 123 may identify recipient data, including one or more destination addresses, associated with transactions that have been flagged as suspicious or may be associated with fraudulent behavior. As used herein, a "destination address" refers to a mechanism for identifying a requested end point or recipient of a transaction. In some examples the destination address may be associated with the payment service system 106 or may be external to the payment service system 106. A destination address may be associated with or generated by specialized hardware or software used by the payment service system 106 or a user.

In some examples, the fraud management component 119 may use a machine-learning to identify recipient data associated with a scammer and to associate the pirated content with the recipient data associated with the scammer. The fraud management component 119 may coordinate with the transaction monitoring component 123 to detect fraudulent behavior, identify corresponding recipient data associated with the fraudulent behavior, and flag the corresponding account or destination address associated with the fraudulent behavior. In some examples, the machine-learning model(s) can be trained using one or more inputs, including but not limited to, content of pirated content, determinations from one or more other machine-learning models trained to evaluate suspected pirated content (e.g., as described above), websites hosting pirated broadcasts, quality of pirated broadcasts, handles of accounts conducting pirated broadcasts, ages of the accounts (e.g., length of time on the payment service), transaction activity associated with the accounts (e.g., recency of transactions, frequency of transactions, volume of transactions, timing of transactions, value of transactions, etc.), numbers of transactions requested to particular recipients in a defined period of time, and others.

In some examples, once the recipient data has been identified as being associated, or likely to be associated, with fraudulent behavior, the fraud management component 119 can associate the recipient data with pirated content. For example, the fraud management component 119 can generate a flag associated with the recipient data or mark an indicator that the recipient data is associated with fraudulent behavior or pirated content. The fraud management component 119 can also store a link to the pirated content to associate with recipient data.

In some examples, the fraud management component 119 may associate one or more fraud indicators 132 with the account. In some examples, fraud management component 119 may generate flags to be associated with one or more accounts suspected of perpetuating scams. As an example and not by way of limitation, based on information from stream monitoring component 117 and/or transaction monitoring component 123, fraud management component 119 may identify one or more accounts associated with a payment service system 106 to flag as suspicious or as potentially associated with a scammer. In some examples, the fraud management component 119 may flag one or more destination addresses associated with accounts of a payment service system 106 as suspicious or related to fraudulent behavior.

In some examples, the account management component 121 may manage the accounts of users of the payment service system 106. In some examples, the account management component 121 may maintain the records of users of the payment service system, including accounts of scammers and innocent users. The records of users of the payment service system 106 can include recipient data associated with the users, such as destination addresses (e.g., of bank accounts, cryptocurrency wallets, etc.) of users (which may or may not be linked to the accounts), payment proxies associated with the accounts, unique identifiers for the accounts, identification information for the users, etc. In some examples, the account management component 121 may manage account verification and/or "Know Your Customer" processes on behalf of the payment service system 106 through which the payment service system 106 can identify actual users behind the accounts. As an example, the account management component 121 can send requests to users 114 associated with accounts to verify their respective accounts. In some examples, verification can prompt a user to provide a document verifying their identity, perform an action, or the like. In some examples, the account management component 121 can send requests to verified contacts or trusted contacts of users to verify accounts.

In the case of accounts suspected of being associated with fraudulent activity, the account management component 121 can take proactive steps to verify the legitimacy of the account and of the activity. As an example and not by way of limitation, if the fraud management component 119 identifies a, account as being associated with fraudulent activity, then the account management component 121 may send a request to a user device 112 associated with a respective user 114 to provide a form of identity verification. As an example and not by way of limitation, the account management component 121 may request the user 114 to scan a form of identification to verify their identity.

The account management component 121 can include one or more machine-learning models trained to perform automated verification of user-supplied account identification information. As an example, the payment service system 106 can prompt users who conduct a threshold number of transactions or transactions amounting to a threshold amount to provide verification of the user's identity. Identity verification procedures can be used by the payment service to ensure that the payment service knows who is ultimately responsible for the operations of the account. Identity verification can be performed by a user uploading identity verification data, such as an image of a legal identification document, such as a state identification, driver's license, passport, etc. An operator of the payment service can manually verify that the identification document appears legitimate and matches the identifying information associated with the account.

In some examples, machine-learning models can be trained to expedite the process of verifying identification documents. As an example, a machine-learning model can be trained on input consisting of valid and invalid identification documents, identification documents already associated with accounts on the payment service, associations between identifying information registered to accounts and identifying information represented on identifying documents etc. The machine-learning model can analyze real-time input consisting of the records of an account (e.g., the user identifying information associated with the account)

and a purported identification document for the user. The output of the machine-learning model can include a determination as to whether the identification document appears legitimate (e.g., not fake), valid (e.g., not expired), and corresponds to the user.

The receipt, use, and storage of personally identifiable information, such as the types of identification documents envisioned for use by the machine-learning models of the account management component 121 represent highly sensitive information to which users entrust the payment service. As such, it is important that the identification documents and other personally identifiable information (hereafter referred to collectively as "sensitive identification information") is stored in a secure and responsible manner. Many services publicize privacy policies dictating the use and management of sensitive identification information. However, how those privacy policies are enforced often relies on non-technical solutions to ensure that the polices are followed and the sensitive identification information is protected.

Training a machine-learning model to verify sensitive identification information may leverage the large-scale storage and use of the sensitive identification information, as least for a short period of time. As an example, training a machine-learning model often may have the machine-learning model "learn" from positive and negative examples of valid sensitive identification information in one or more rounds of training. This training regimen is incompatible with privacy policies that require that sensitive identification information be destroyed after a period of time or that access is restricted to only operators of the payment service with a justifiable need to access the data. In order to provide technical measures to protect sensitive identification information, this disclosure contemplates the use of a "self-destructing" file format for transmission and/or storage of sensitive identification information, such as to or by the account management component 121. As an example, the self-destructing file format can delete instances of the data stored in the file format automatically or otherwise render the data inaccessible once conditions permitting its access have expired. The use of a self-destructing file format may allow for different components of the payment service (e.g., the account management component 121 and datastore 128) to transfer a file stored in the self-destructing file format to recipients to process the data corresponding to the file, including for use to train a machine-learning model, without risking the compromise of the privacy and security of the user associated with the sensitive identification information. The self-destructing file format therefore increases user comfort with providing sensitive identification information while also increasing data interoperability and data security.

In some examples, the self-destructing file format used by the payment service system 106, e.g., by the account management component 121, can delete instances of itself upon detection or expiration of specified conditions. As an example, the data stored in the self-destructing file format can be set to be used for seven days after the data is provided to the payment service system 106. Once the data is converted to the self-destructing file format, the data can be accessed as normal. However, after the expiration of the seven-day time period, the self-destructing file format can delete all instances of the data or otherwise render the data inaccessible. As an example, the self-destructing file format can comprise an executable wrapper for data, such as sensitive identification information. When a user or system accesses the data stored in the self-destructing file format under normal conditions, the executable wrapper allows the data to behave normally. For example, an image of an identification document can be displayed or otherwise accessed. However, if the data is accessed after the seven-day time period has expired, the executable wrapper can operate to delete the data in an unrecoverable manner. Additionally or alternatively, the executable wrapper can encrypt the data stored in the self-destructing file format. Instead of deleting the data itself, the executable wrapper can delete the only instances of the decryption keys.

The self-destructing file format has advantages over data management schemes which rely on a server or other network components to administer access to data. For example, the self-destructing file format can operate on a local level and on all instances of the data automatically. Therefore, copy restrictions are not as necessary because the data will eventually expire and be useless to the user who has copied the data stored in the self-destructing file format. As another example, because the self-destructing file format does not require network access, the self-destructing file format enables for secure offline usage of protected or sensitive data.

To train a machine-learning model to verify sensitive identification information, the data is first converted to the self-destructing file format with access restrictions appropriate for the policies of the payment service or by the preferences of the users that supplied the data. Because the self-destructing file format does not alter the data itself, the data can still be used to training machine-learning models through one or more rounds of training, verification, validation, etc. Additionally, the machine-learning model is able to access all desired training data during the training process because metered access restrictions, or other common techniques to prevent the mass exposure of sensitive identification data, are not required. Similarly, once the machine-learning model is trained, real-time input to the machine-learning model can be converted into the self-destructing file format before it is provided to the machine-learning model or by the machine-learning model itself. This can provide a technical mechanism to ensure users that their data is being used responsibly. The machine-learning model can then process the supplied sensitive identification information and attempt to verify the identity of the user.

In some examples, the account management component 121 may generate alternative accounts or alternative destination addresses to use for transactions involving accounts or destination address associated with fraudulent activity. As an example, the account management component 121 may hold funds sent to an account or destination address associated with fraudulent activity until the user's identity is verified. Upon receiving verification of a user's 114 identity, the account management component 121 may release funds held in the alternative accounts back to the account. In some examples, the account management component 121 may combine the two accounts (an original account and alternative account) or the two destination addresses (original destination address and the alternative destination address). The account management component 121 may delete the alternative account or the alternative destination address after verification has been provided or the alternative account may be a pooled account used to hold assets involved in suspected fraudulent activity. In some examples, in response to failure to perform verification of a user's 114 identity within a predetermined time period, the account management 121 may return funds sent to an account or destination address (or an alternative account or alternative destination address) back to the respective user 114 that sent the funds. In some examples, if a user 114 requests to cancel a transfer of funds to a flagged destination address, then the account management component 121 may return the funds to the user 114.

In some examples, a machine-learning model may be trained on data associated with previous transactional data 134 corresponding to fraudulent behavior. In some examples the transactional data 134 may include one or more of recipient identifier, one or more prior transactions (e.g., associated with a recipient), amount of payment, type of payment, geolocations of sender and recipient, time of day, context (e.g., other applications running in the background, such as a streaming application), entry point (e.g., origination of the payment request, whether the payment request came from a first-party location or an external source, etc.), and others. In some examples, the transaction monitoring component 123 may perform analysis in real-time to determine whether one or more transactions correspond to fraudulent behavior. That is, in some examples, the trained machine-learning model can be executed in real-time on incoming or recently received transaction data to determine which transactions correspond to fraudulent behavior. In some examples, the payment service system 106 may use a transaction monitoring component 123 to determine whether a requested transaction is indicative of fraudulent activity. The payment service system 106 may use a machine-learning model to determine whether the requested transaction is indicative of fraudulent activity. As an example, the characteristic indicative of fraudulent activity can include the information associated with the intended recipient of the request transaction, such as the destination address or other recipient information. As another example, the characteristic indicative of fraudulent activity can include other contextual information, such as the amount or timing of the transaction that enables one or more machine-learning models used by the transaction monitoring component 123 to provide a determination with suitably high confidence that the transaction is associated with fraudulent activity.

In some examples, the fraud management component 119 may manage fraud indicators 132. In some examples the fraud management component 119 may coordinate with the stream monitoring component 117 to detect identifiers of ongoing scams associated with particular broadcast digital content. As an example and not by way of limitation, fraud management component 119 may utilize information from stream monitoring component 117 to identify one or more accounts associated with fraud and store fraud indicators 132 to be associated with the account. As an example and not by way of limitations, the fraud management component 119 may associate accounts responsible for creating or hosting broadcast digital content with an account associated with the payment service system 106. The fraud management component 119 may perform a lookup of user data to see if there is an account associated with the payment service system 106. That is, the fraud management component 119 can utilize information associated with accounts responsible for creating or hosting broadcast digital content with information associated with payment service accounts. As an example, the fraud management component 119 may identify correspondence in emails or other messaging services internal or external to the payment service used for the accounts and other identifying information.

Returning to the example illustrated in FIG. 1, a second user 114b may be broadcasting content using a streaming service. The first user 114a is viewing the content 111 through a streaming app 109. The content 111 may purport to be live content from a particular event in which the first user 114a is interested. The content 111 may include a call-to-action, such as to send funds to the second user 114b. In some examples, the content 111 may include an activatable link that the first user 114a may click on through user device 112a to perform a context switch to a user interface 113a of a payment service application 110a. The user interface 113a may be a payment interface to send funds to the second user 114b.

In some examples, the stream monitoring component 117 of the payment service system 106 may monitor digital broadcast content, such as content 111. In some examples, the stream monitoring component 117 may flag the stream associated with content 111 as suspicious using one or more machine-learning models. Input to the machine-learning models can include the content itself, identification of the website hosting the content 111, indications of the technical quality of the content 111, a handle of the second user 112b on the streaming service, and other indicators. Based on the input, the machine-learning model can determine that the content 111 is pirated content. The transaction monitoring system 123 of the payment service system 106 can identify transactions associated with the content 111. For example, the content 111 can include recipient data for the second user 114b or other mechanisms for the first user 114a to transmit funds to the second user 114b. Upon determining the recipient data for the second user 114b, the fraud management component 119 of the payment service system 106 can identify and flag a corresponding account of the second user 114b as suspicious. As an example and not by way of limitation, the destination address provided via the link associated with the content 111 may be used to identify a suspicious destination address and a corresponding account of second user 114b on the payment service system 106. In some examples, additional or alternative techniques can be used to determine the account of the second user 114b is fraudulent. For instance, the fraud management component 119 can analyze transactions and observe or identify trends indicating that the account of the second user 114b is fraudulent.

As a result of the account of the second user 114b being flagged, the transaction monitoring component 123 and account management component 121 may modify how transactions are processed with the account of the second user 114b. In some examples, the transaction monitoring component 123 can interrupt or intervene in transactions that are associated with the account of the second user 114b. As an example, the account management component 121 may generate an alternative destination address or alternative account to temporarily hold funds intended to be sent to the account of the second user 114b until the second user 114b verifies their identity.

While the fraud management component 119 has flagged the account of the second user 114a, the first user 114a can attempt to initiate a transaction with the second user in response to the content 111. Rather than process the transaction as normal, the transaction monitoring component 123 can cause one or more user interventions to be performed. As an example, the user interface of the payment service app 110a can transition from a payment request interface 113a to a user intervention interface 113b, rather than a payment confirmation interface. Although many user interventions are contemplated, in the example illustrated in FIG. 1, the user intervention includes notifying the first user 114a that the first user 114a is attempting to transact with an account that has been flagged as suspicious and/or fraudulent. In some examples, the first user 114a may be provided a plurality of user interventions in response to the attempt to perform the transaction. The plurality of user interventions may include cancelling the transaction, learning more about why the account has been flagged, etc.

In some examples the first user 114a may insist on performing the transaction despite the user interventions. If the first user 114a attempts to perform the transaction, the account management component 121 may process the transaction and hold the funds sent by the first user 114a in an alternative account or an alternative destination address until the identity of the second user 114b has been verified.

In some examples, if an account or destination address associated with the second user 114b has been flagged as suspicious, the account management component 121 may send a request to the user device 112b of the second user 114b to verify the second user's 114b identity. In some examples, the request to verify the second user's 114b identity may be sent after initially determining to flag an account as suspicious or after a threshold number of transactions have been performed. In some examples, the second user 114b may access their user device 112b to open a payment service application 110b to access a user interface 115a where the second user 114b is notified that their account has been flagged as fraudulent. In some examples, the user interface 115a may include an activatable link to enable the second user 114a to verify their identity and account. In some examples, the second user 114b may be provided one or more methods to verify their identity. As an example and not by way of limitation, the second user 114b may provide photo identification to the payment service application 110b via a camera to verify their identity. The photo identification can be stored and processed using techniques described herein, including through the use of self-destructing file formats, to facilitate the privacy of the second user 114b. In some examples the photo identification can be manually reviewed by operators of the payment service. In some examples, the photo identification can be automatically reviewed using one or more machine-learning models of the account management component 121.

After the second user 114a verifies their identity, the payment service application 110b may display a user interface 115(B) thanking the second user 114b for verifying their account. In some examples, the user interface 115(B) may include an activatable link to access the second user's 114b account.

While an example of a second user 114b successfully verifying their account is shown, there may be scenarios where the second user 114b is unable to verify their identity. In some examples, if the second user 114b is unable to verify their identity after a predetermined threshold time period, the transaction monitoring component may return the funds initially sent to the suspicious destination address associated with the second user 114b to the account of the first user 114a. In some examples, the payment service system 106 may notify the first user 114a the reason why the funds were returned. In some examples, the account management component 121 may further restrict the ability of the second user 114b to use their account until they verify their identity. As an example and not by way of limitation, the second user 114b may have initially provided photo verification of the user upon initial creation of the second user's 114b account. The account management component 121 may request the second user 114b to provide the same or similar photo verification to verify the second user's 114b account.

The datastore 128 may store data used by the payment service system 106. In at least one example, the datastore 128 can store fraud indicators 132 and transactional data 134 corresponding to one or more accounts of the payment service. The fraud indicators 132 may be used to mark or flag recipient data associated with suspicious accounts as described herein. The transactional data 134 can be used or processed by machine-learning models of the payment service system 106 to identify one or more accounts associated with potential fraudulent behavior as described herein. Additional details associated with the datastore 128 are described below with reference to FIGS. 8-12.

Referring to FIGS. 2A-2F, example graphical user interfaces 202a-202f for providing user interventions in response to detection of potential scam or fraudulent activity are shown. In some examples, the example graphical user interfaces 202a-202f may be displayed within a payment service app executing on a user device or any user interface of the user device (e.g., user device 112a of a first user 114a). While this disclosure describes transactions in context of cryptocurrency transactions, this disclosure contemplates other transactions including different assets (e.g., cash, stock, etc.), particularly peer-to-peer transactions.

The process associated with the user interfaces 202a-202f may be initiated from a variety of entry points provided by the payment service. In some examples, a first user 114a may select an activatable link from content 111 viewed on a streaming application 109. The first user 114a may attempt to perform a transaction with a destination address or other recipient data that has been flagged as suspicious. As another example, the process may also be initiated from a first user 114a accessing the user interface 202a within a payment service application 110a of the user device 112a. As another example, the process may be initiated from a first user 114a selecting an activable link to perform a transaction with a destination address from other sources (e.g., from social media and the like).

FIG. 2A illustrates a user interface 202a including a transaction prompt 228 and an activatable user interface element 230. The first user 114a may attempt to perform a transaction to send funds to a destination address (or other recipient data) associated with a second user 114b. The transaction prompt 228 may include a destination address, an account associated with the destination address or information identifying the account, an amount associated with the transaction, a source for the transaction, and a total corresponding to the transaction. In some examples, the activatable link associated with content 111 or transaction may auto-populate one or more fields of the transaction prompt 228.

The first user 114a may select the activatable user interface element 230 to perform the transaction associated with the transaction prompt 228. In response to selecting the activatable user interface element 230, the user interface 202a can transition to user interface 202b as shown in FIG. 2B. User interface 202b includes an intervention regarding the requested transaction. In particular, the user interface 202b includes an alert 232 and activatable user interface elements 234, 235, 236, and 238. In some examples, the payment service system 106 may initially flag a destination address associated with the transaction as suspicious as described herein. The alert 232 may provide a notification to the first user 114a that the destination address or account that the first user 114a is attempting to perform a transaction with has been marked as suspicious. The activatable user interface element 234 may be selected to access more information corresponding to the alert 232. As an example and not by way of limitation, the payment service system 106 may provide additional information corresponding to how or why a destination address has been flagged as suspicious. The activatable user interface element 235 may be selected for the first user 114a to request the second user 114b associated with the flagged destination to verify their identity. Selecting activatable user interface element 235 may initiate a process corresponding to user interfaces 302a-302c. The activatable user interface element 236 may be selected to complete the transaction. In some examples, the payment service system 106 may process the transaction to move the funds associated with the transaction to an alternative destination address until further verification has been provided by the second user 114b associated with the flagged destination address. The activatable user interface element 238 may be selected cancel the transaction.

In response to the first user 114a selecting activatable user interface element 238, the user interface 202b can transition to user interface 202c as shown in FIG. 2C. The user interface 202c may include a prompt 240 and an activatable user interface element 242. The prompt 240 may indicate the transaction the first user 114a initiated was cancelled. The activatable user interface element 242 may be selected to return to either a home screen of a payment service application 110a or a transaction user interface where the first user 114a may input details to perform another transaction.

In response to the first user 114a selecting activatable user interface element 236, the user interface 202b can transition to user interface 202d as shown in FIG. 2D. The user interface 202d may include a prompt 244 and an activatable user interface element 246. The prompt 244 may indicate that the transaction has been processed and the funds associated with the transaction has been transferred to a temporary holding account until the second user 114b verifies their account. The activatable user interface element 246 may be selected to return to either a home screen of a payment service application 110a or a transaction user interface where the first user 114a may input details to perform another transaction.

Figure 2F:
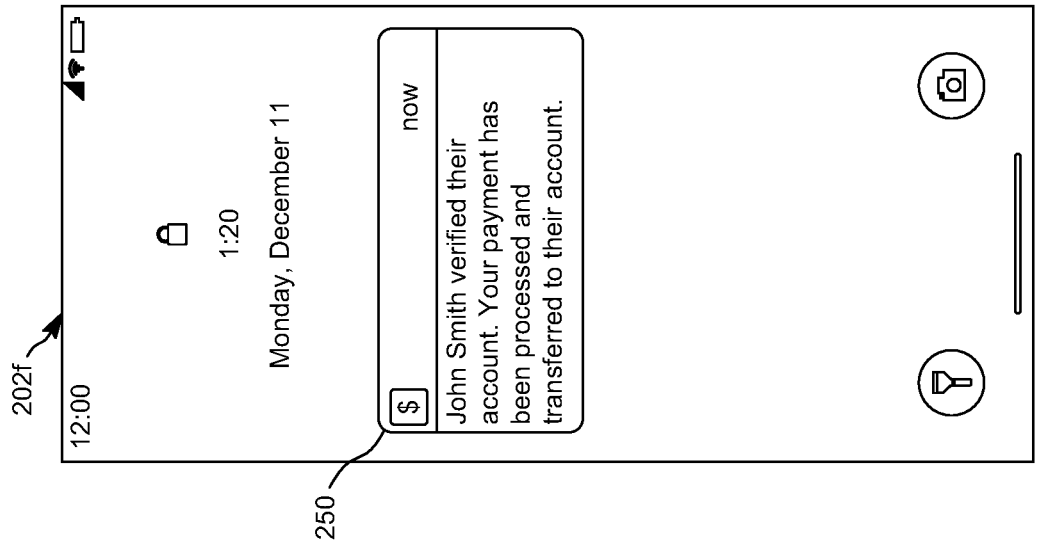
Figure 2E:
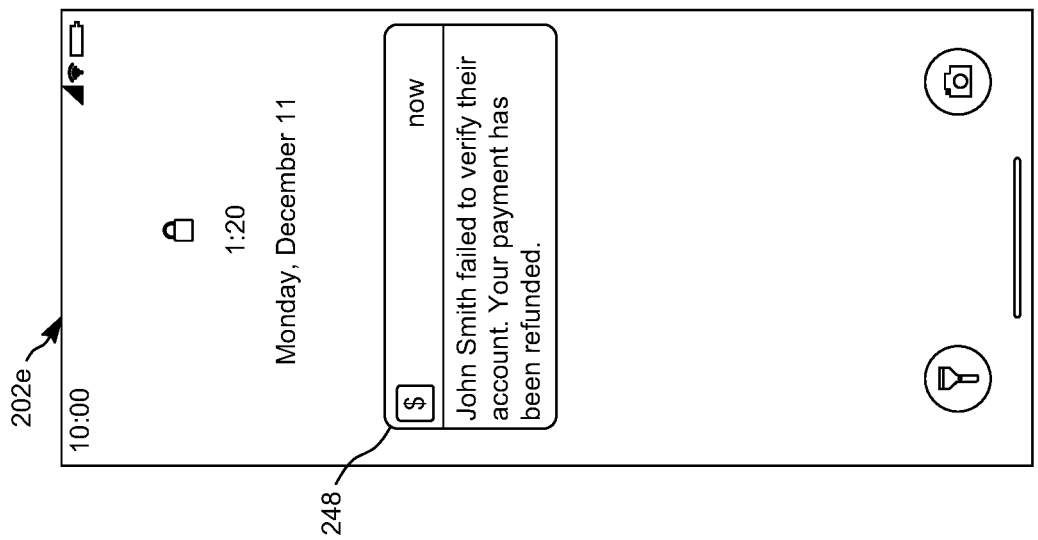

FIG. 2E illustrates a user interface 202e including a notification 248. The first user 114a may receive the notification 248 in response to a second user 114b failing to verify their identity after the first user 114a performed or requested a transaction with a destination address associated with the second user 114b. The notification 248 may alert the first user 114a via a user device 112a through a payment service application 110a that the second user 114b failed to verify their identity and that the funds associated with the transaction have been refunded to the account of the first user 114a. The payment service system 106 may return the funds associated with the transaction from an alternative destination address to the account of the first user 114a.

FIG. 2F illustrates a user interface 202f including a notification 250. The first user 114a may receive the notification 250 in response to the second user 114b successfully verifying their identity. The notification 250 may alert the first user 114a via a user device 112a through a payment service application 110a that the second user 114b successfully verified their identity and that the funds associated with the transaction have been transferred to the destination address associated with the second user 114b. The payment service system 106 may transfer the funds associated with the transaction from an alternative destination address to the destination address or the account of the second user 114b.

Referring to FIGS. 3A-3C, example graphical user interfaces 302a-302c for verifying a user identity are illustrated. In some examples, the example graphical user interfaces 302a-302c may be displayed within a payment service app executing on a user device or any user interface of the user device. (e.g., user device 112a of a first user 114a or a user device 112b of a second user 114b).

The process of verifying a user identity may be initiated from a variety of entry points provided by the payment service. In some examples, the payment service system 106 may flag a destination address or an account associated with a second user 114b as being suspicious or associated with fraudulent behavior. The second user 114b may receive an alert in response to the destination address or the account associated with the second user 114b being flagged as suspicious. As an example, the account associated with the second user 114b can be flagged as suspicious through the interactions of the stream monitoring component 117, fraud management component 119, and account management component 121 of the payment service system 106 as described herein. In some examples, the payment service system 106 may receive a request from a first user 114a attempting to send funds to a destination address associated with the second user 114b to verify their identity.

FIG. 3A illustrates a user interface 302a including a notification 304. The notification 304 may be presented on a user device 112b of a second user 114b through a payment service application 110b. The notification 304 may notify the second user 114b that their account has been flagged as being suspicious and requests verification from the second user 114b. The notification 304 may be issued by the account management component 121. The notification 304 may also be an activatable user interface element that the second user 114b may select to access a payment service application 110b to verify their identity.

In response to the second user 114b selecting the notification 304, the user interface 302a can transition to user interface 302b as shown in FIG. 3B. The user interface 302b includes a prompt 306 and activatable user interface elements 308-310. The prompt 306 may include an indication that the account of the second user 114b has been flagged for fraudulent behavior. The prompt 306 may also include a request for the user to verify their identity. The activatable user interface element 308 may be selected to link a verified account to the account of the second user 114b. As an example and not by way of limitation, a second user 114b may link a bank account associated with the second user 114b with the account of the second user 114b. For instance, a second user 114b may provide a verified bank account associated with a user matching the same credentials as the account of the second user 114b of the payment service.

The activatable user interface element 309 may be selected to provide an additional identity verification. As an example, activating the user interface element 309 may prompt a user to supply identity verification data, such as a photo of identification documentation, of the second user 114b. The activatable user interface element 310 may be selected to cancel the verification process. In some examples, the payment service system 106 may maintain a flag on the account associated with the second user 114b indicating the account is suspicious and requests verification prior to further use of one or more functions of the account. The payment service system 106 may use one or more of the fraud management component 119 or the account management component 121 to manage the identification of suspicious accounts. The payment service application 110b of the user device 112b may maintain a notification for the second user 114b within the payment service application 110b or the user device 112b requesting the second user 114b to verify their identity upon verification has been provided.

In response to the second user 114b selecting the activatable user interface element 309, the user interface 302b can transition to user interface 302c as shown in FIG. 3C. The user interface 302c includes a camera interface 313, an identification border 314, an image of a photo identification 315, and an activatable user interface element 316. The camera interface 313 may reflect the image currently captured by a camera of the user device 112*b* to provide photo verification of the second user's 114*b* identity. The camera interface 313 may include an identification border 314 marking where the second user 114*b* should align the photo identification 315. The camera interface 313 may automatically capture an image of the photo identification 315 for user verification in response to detecting the image of the photo identification 315 is sufficient (e.g., the photo identification aligns within the identification border 314 or the camera captures sufficient user identification details through text recognition of the image captured within the camera interface 313). The second user 114*b* may also click an activatable user interface element associated with the camera interface 313 to capture the image to be used for the photo identification. Although not shown, the second user 114*b* may be alerted when the camera interface 313 has not captured a clear image to be used for the photo identification 315. The activatable user interface element 316 may be selected by the second user 114*b* to submit the photo identification 315 for verification of the second user's 114*b* identity.

Once the second user 114*b* submits the photo identification 315 for verification, the account management component 121 can optionally convert the photo identification 315 to the self-destructing file format described herein. The self-destructing file format can protect the identity of the second user 114*b* while their identity is being verified through prevent improper use of the photo identification 315 beyond the permissions granted to the account management component 121. As further described herein, to verify the identity of the second user 114*b*, the account management component 121 can query a machine-learning model trained to assess the validity of identity verification data. The machine-learning model can, for example, provide a binary determination of the validity of the photo identification 315 along with a degree of confidence in the assessment. The determination of the machine-learning model can be used to streamline the verification process. For example, if the machine-learning model accepts or rejects the photo identification 315 with a high degree of certainty, the account management component 121 can remove or maintain the flag on the account of the second user 114*b*. As another example, if the machine-learning model is unable to make a determination with a high degree of confidence, the photo identification 315, still stored in the self-destructing file format, for manual verification as a fallback provision.

FIGS. 4A-7 illustrate example processes associated with techniques described herein. In at least one example, the processes can be performed by functional components described above with reference to FIG. 1; however, processes are not limited to being performed by such functional components. Further, the processes include steps or operations that can be performed in any order and, in some examples, individual steps may be optional. The processes shown in FIGS. 4A-7 may be performed utilizing one or more processing devices (e.g., user device 112 or payment service system 106) associated with the recited entities that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof. The processes shown in FIGS. 4A-7 may be performed utilizing one or more specialized components of the processing devices (e.g., stream monitoring component 117, fraud management component 119, account management component 121, or transaction monitoring component 123 of payment service system 106) consistent with the description here.

Particular embodiments may repeat one or more steps of the process of any of FIGS. 4A-7, where appropriate. Although this disclosure describes and illustrates particular steps of the process of any of FIGS. 4A-7 as occurring in a particular order, this disclosure contemplates any suitable steps of the process of any of FIGS. 4A-7 occurring in any suitable order. Moreover, although this disclosure describes and illustrates an example method as described above, including the particular steps of the process of any of FIGS. 4A-7, this disclosure contemplates any suitable method for performing the respective process, including any suitable steps, which may include all, some, or none of the steps of the process of any of FIGS. 4A-7, where appropriate. Furthermore, although this disclosure describes and illustrates particular components, devices, or systems carrying out particular steps of the process of any of FIGS. 4A-7, this disclosure contemplates any suitable combination of any suitable components, devices, or systems carrying out any suitable steps of the process of any of FIGS. 4A-7.

Figure 4A:
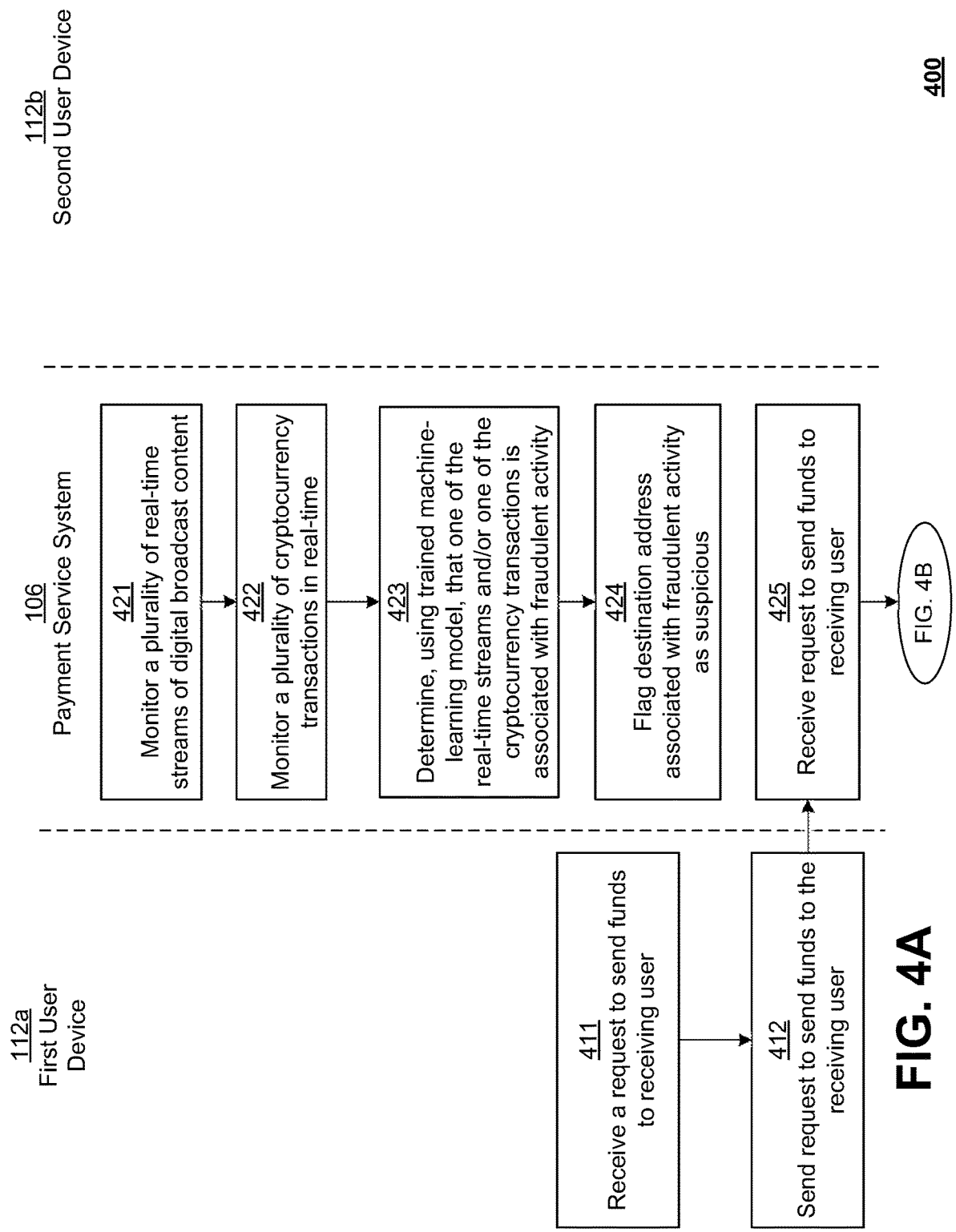
FIGS. 4A-4C illustrate an example process of providing a user intervention in response to detecting potential scam or fraudulent activity according to some embodiments disclosed herein.
Figure 4B:
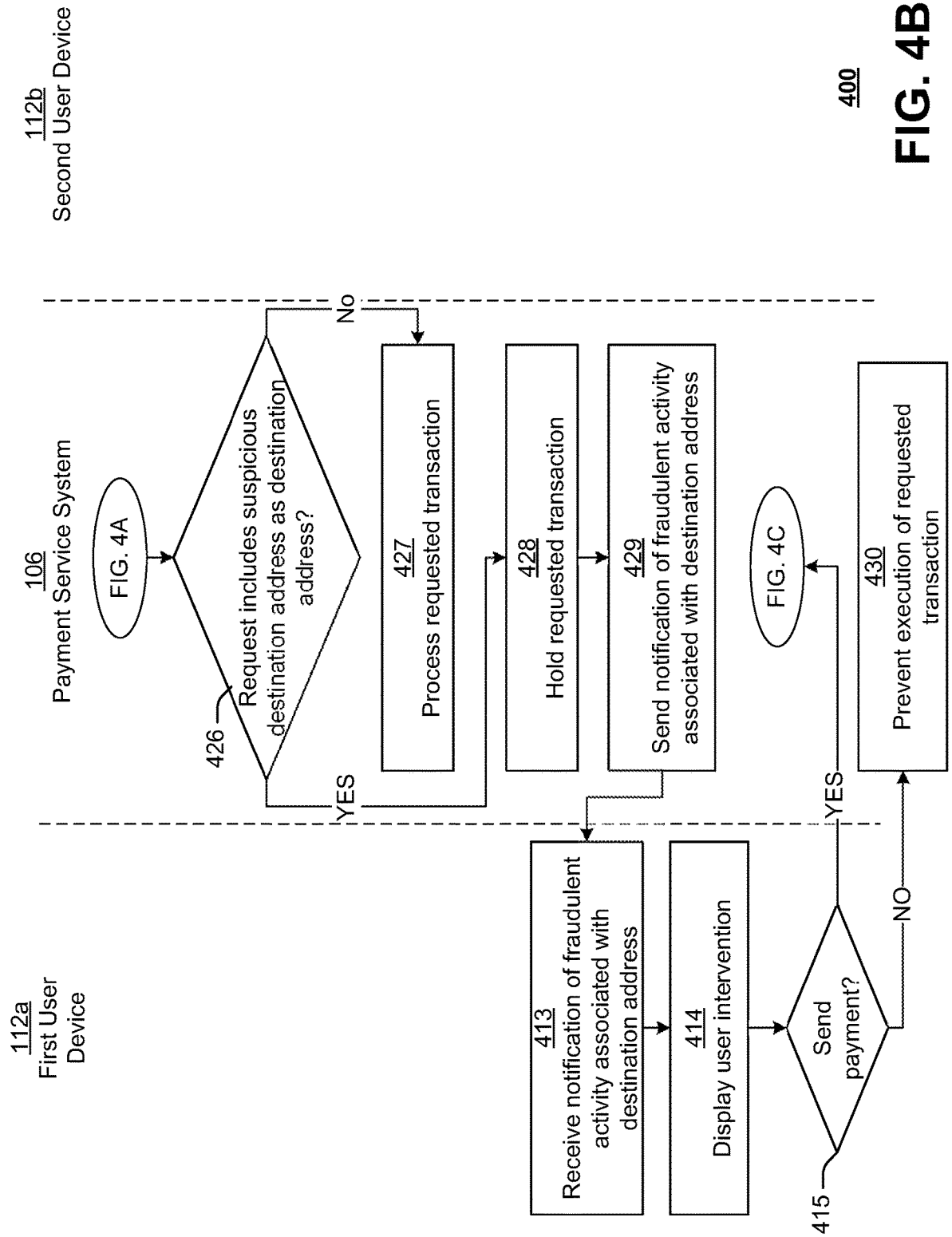
Figure 4C:
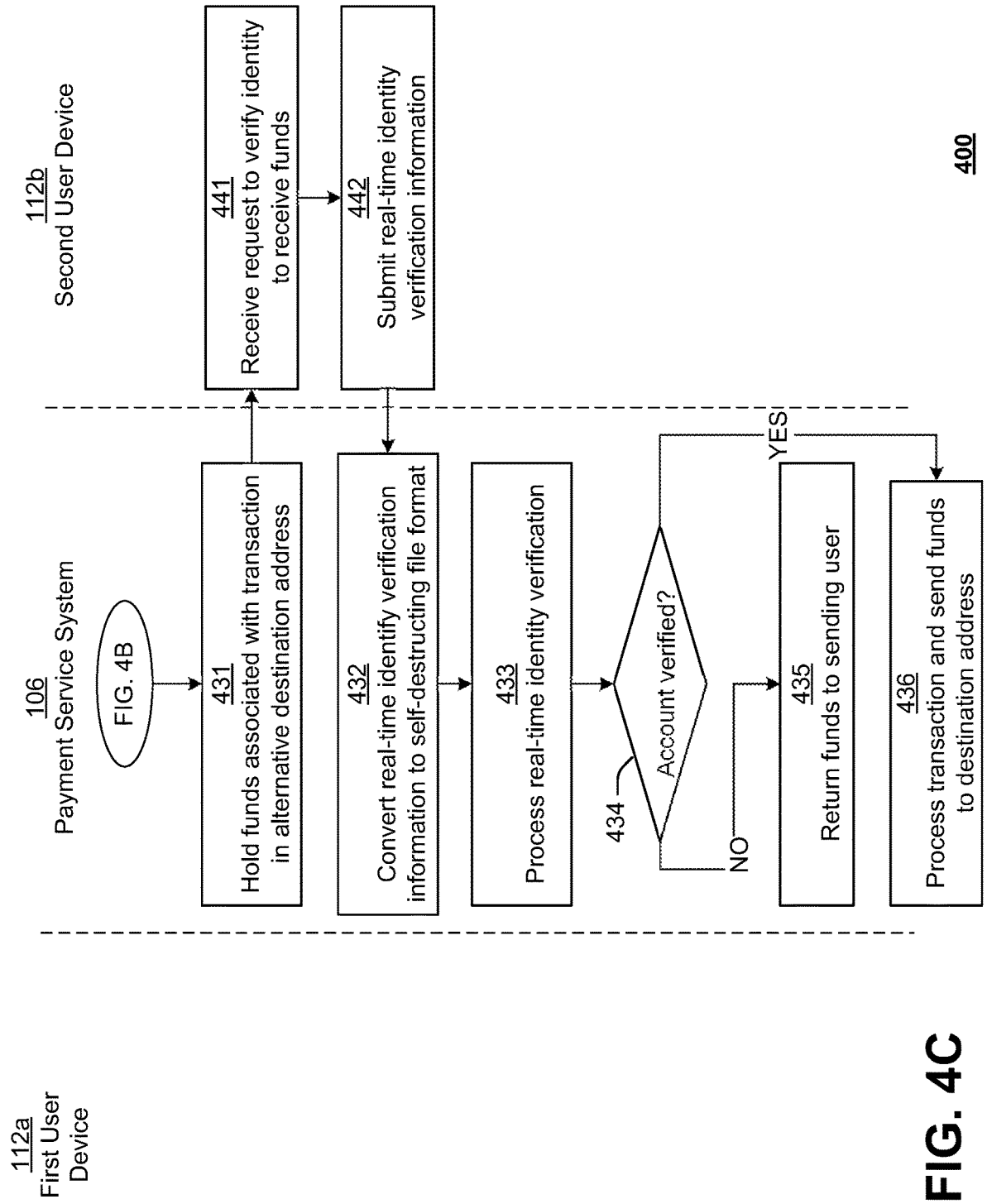

FIGS. 4A-4C illustrate an example process 400 for providing a user intervention in response to detecting potential scam or fraudulent activity. Steps are described below as being performed by individual functional components of the payment service system 106; however, additional or alternative functional components can perform the steps in additional or alternative examples.

At step 421, a payment service system 106 may monitor a plurality of real-time streams of digital broadcast content as shown in FIG. 4A. The payment service system 106 may use the stream monitoring component 117 to monitor a plurality of real-time streams of digital broadcast content from a plurality of sources. As an example and not by way of limitation, the payment service system 106 may use the stream monitoring component 117 to access real-time streams from a streaming service to monitor the plurality of real-time streams of digital broadcast content. In some examples, the payment service system 106 may identify a specific category of real-time streams of digital broadcast content to monitor. As an example and not by way of limitation, the stream monitoring component 117 may monitor real-time streams of digital broadcast content corresponding to cryptocurrency. In some examples, the stream monitoring component 117 may use one or more machine-learning models to facilitate and expedite the monitoring and identification of pirated, or otherwise suspect, content, as discussed herein.

In some examples, the stream monitoring component 117 may detect one or more requests to access or perform a transaction associated with a stream. As an example and not by way of limitation, the stream monitoring component 117 may detect when a user 114 associated with the payment service is attempting to perform a transaction on the payment service in response to the user 114 selecting an activatable link to perform a transaction on the payment service. The activatable link may auto-populate the fields with a destination address (e.g., recipient data) of the payment service and the stream monitoring component 117 may identify a corresponding stream that includes the activatable link in response to detecting a third-party entity accessing a destination address of the payment service. In some examples, the payment service system 106 may use a fraud management component 119 that may use a machine-learning model to identify recipient data associated with a scammer, which, in some examples, can be associated with the pirated content.

At step 422, the payment service system 106 may use a transaction monitoring component 123 to monitor a plurality of cryptocurrency transactions in real-time. While this disclosure describes the process 400 in the context of cryptocurrency transactions, this disclosure contemplates the process 400 being used for other types of transactions involving other kinds of assets. In some examples, the transaction monitoring component 123 may use a machine-learning model to analyze the plurality of cryptocurrency transactions in real-time to identify whether one or more transactions correspond to fraudulent activity. The machine-learning model may be trained on transactional data 134 to identify certain transactions or series of transactions corresponding to potentially fraudulent activity as described herein.

At step 423, the payment service system 106 may use the stream monitoring component 117 to determine that one of the real-time streams and/or one of the cryptocurrency transactions is associated with fraudulent activity. In some examples, the stream monitoring component 117 may use a trained machine-learning model to determine one or more real-time streams is associated with fraudulent activity. As an example and not by way of limitation, the stream monitoring component 117 may identify a pirated stream including links to a payment service application to send funds to a destination address. In some examples, the payment service system 106 may use a fraud management component 119 that may use a machine-learning to identify recipient data associated with a scammer, which, in some examples, can be associated with the pirated content. In some examples, the transaction monitoring component 123 may use a machine-learning model to analyze the plurality of cryptocurrency transactions in real-time to identify whether one or more transactions correspond to fraudulent activity. As described above, a machine-learning model may be trained to use the output from the above-described machine-learning models as input to determine that the real-time streams and/or cryptocurrency transactions are associated with fraudulent activity. The stream monitoring component 117, fraud management component 119, and transaction monitoring component 123 may coordinate to associate fraudulent transaction activity involving accounts of the payment service with a particular stream of digital broadcast content.

At step 424, the payment service system 106 may use the stream monitoring component 117 to identify one or more destination addresses that are associated with the real-time stream that is associated with fraudulent activity. The payment service system 106 may use a fraud management component 119 to manage one or more fraud indicators 132 for one or more destination addresses associated with the fraudulent activity. The payment service system 106 may use an account management component 121 to flag the one or more destination addresses, or other recipient data, associated with fraudulent activity as suspicious. The payment service system 106 may configure how future transactions for the destination address are processed. As an example and not by way of limitation, the account management component 121 may generate an alternative destination address associated with the flagged destination address. Future transactions that include deposits into the account may be sent to the alternative destination address until further verification of the user's identity has been confirmed.

At step 411, the first user device 112*a* (e.g., user device 112*a*) corresponding to a first user (e.g., sending user or first user 114*a*) may receive a request to send funds to a receiving user (e.g., second user 114*b*). The first user device 112*a* may receive the request to send funds to the receiving user from a plurality of different sources. As an example and not by way of limitation, the sending user may be viewing a stream that includes an activatable link that requests to send funds to a receiving user through a payment service system 106. As another example and not by way of limitation, the sending user may receive an activatable link that requests to send funds to a receiving user through a payment service system 106 from a social media website.

At step 412, the first user device 112*a* may send the request to send the funds to the receiving user to the payment service system 106. In some examples, a payment service application 110*a* may present a user interface to the sending user on the first user device 112*a* including a transaction interface similar to user interface 202*a*. The sending user may confirm the request to send funds to the receiving user.

At step 425, the payment service system 106 may receive the request to send funds to the receiving user. The transaction monitoring component 123 of the payment service system 106 may analyze the request to send funds. The analysis may include reviewing the amount, the type of transaction, the destination address, and the like.

At step 426, the process 400 may continue to FIG. 4B, where the payment service system 106 may determine whether the request includes suspicious destination address (or other recipient data) as the destination address. In some examples the payment service system 106 may use a transaction monitoring component 123 to determine whether a requested transaction is associated with a suspected fraudulent account. As described, the transaction monitoring component 123 may use a machine-learning model to identify requests that may be potential scam transactions. The payment service system 106 may review the datastore 128 to determine whether the destination address has been flagged as a suspicious destination address. In some examples the destination address may be an address associated with the payment service system 106 or an address external to the payment service system 106. In some examples, the destination address may be identified using a scheme established by the payment services 106 or using one or more open or commonly available standards. The payment service system 106 may use the account management component 121 to determine whether the destination address has been flagged as a suspicious address.

At step 427, if the request does not include a suspicious destination address, the payment service system 106 may process the requested transaction, for example using a peer-to-peer payment component 1238 discussed herein. The payment service system 106 may transfer the funds from the account of the sending user to the receiving user.

At step 428, if the request does include a suspicious destination address, the payment service system 106 may hold the requested transaction. As an example, the payment service system 106 may store a record of the requested transaction, and temporarily hold the funds associated with the account of the first user 114*a*, but not transfer the funds directly to the account of the second user 114*b*. Holding the requested transaction is a first form of intervention provided by the payment service system 106 upon detection of a transaction associated with a suspected fraudulent account.

At step 429, the payment service system 106 may send a notification of fraudulent activity associated with the destination address to the first user device 112a. The payment service system 106 may send a notification through a payment service application 110a on the first user device 112a to notify the sending user that the destination address associated with the transaction has been flagged for potentially fraudulent activity. The notification that the destination address associated with the transaction has been flagged is a second form of intervention provided by the payment service system 106 upon detection of a transaction associated with a suspected fraudulent account.

At step 413, the first user device 112a may receive the notification of fraudulent activity associated with the destination address. The notification may be sent to a payment service application 110a on the first user device 112a. Upon selecting the notification, the first user device 112a may present a prompt and one or more activatable user interface elements.

At step 414, the first user device 112a may display one or more user interventions. As an example and not by way of limitation, the first user device 112a may display through a payment service application 110a a prompt including information notifying the user the destination address has been flagged for fraudulent activity. The user intervention may include one or more activatable user interface elements to cancel the transaction, proceed with the transaction, access more information for the notification, and the like.

At step 415, the first user device 112a determines whether to proceed with sending the payment. If the sending user decides to cancel the transaction (e.g., through selecting an activatable user interface element to cancel the transaction), then at step 430, the payment service system 106 may prevent the execution of the requested transaction.

At step 431, if the sending user decides to send the payment, then the payment service system 106 may hold the funds associated with the transaction in an alternative destination address as shown in FIG. 4C. The payment service system 106 may use an account management component 121 to generate or identify an alternative destination address to associate with the flagged destination address. The payment service system 106 may transfer the funds from the account of the sending user to the alternative destination address. In response to holding the funds, the payment service system 106 may send a request to the second user device 112b to verify the identity of the receiving user to receive the funds.

At step 441, the second user device 112b may receive the request to verify the identity of the receiving user to receive the funds. As an example and not by way of limitation, the payment service system 106 may send a notification to the payment service application 110b on the second user device 112b to notify the receiving user of the request to verify the identity of the receiving user.

At step 442, the second user device 112b may submit real-time identity verification information or identity verification data. As an example and not by way of limitation, the receiving user may use a camera interface within a payment service application 110b to capture photo identification to be used for identity verification.

At step 432, the payment service system 106 may convert the real-time identity verification information (e.g., a photo, text extracted from a photo, etc.) into a self-destructing file format as described herein At step 433, the payment service system 106 may process the real-time identity verification. In some examples, the account management component 121 may use one or more machine-learning models trained to assess the validity of the submitted real-time identity verification information. The machine-learning models may provide a determination of whether the identity verification data (e.g., identification documentation) is valid and otherwise acceptable along with degree of confidence in the assessment. In some examples, if the machine-learning models are not able to provide an assessment with a high degree of confidence, then the account management component 121 may request manual review of the real-time identity verification information.

At step 434, the payment service system 106 may determine whether the account has been verified. If the payment service system 106 determines that the account has not been verified (e.g., the verification information does not match information stored on the payment service system 106 associated with the account of an intended recipient or otherwise appears to be invalid or unacceptable), then the payment service system 106 may at step 435 return funds to the first user 114a from the alternative destination address. If the payment service system 106 determines that the account has been verified (e.g., the verification information matches information stored on the payment service system 106 associated with the account of an intended recipient), then the payment service system 106 may process the transaction and send the funds to the destination address associated with the receiving user.

Figure 5:
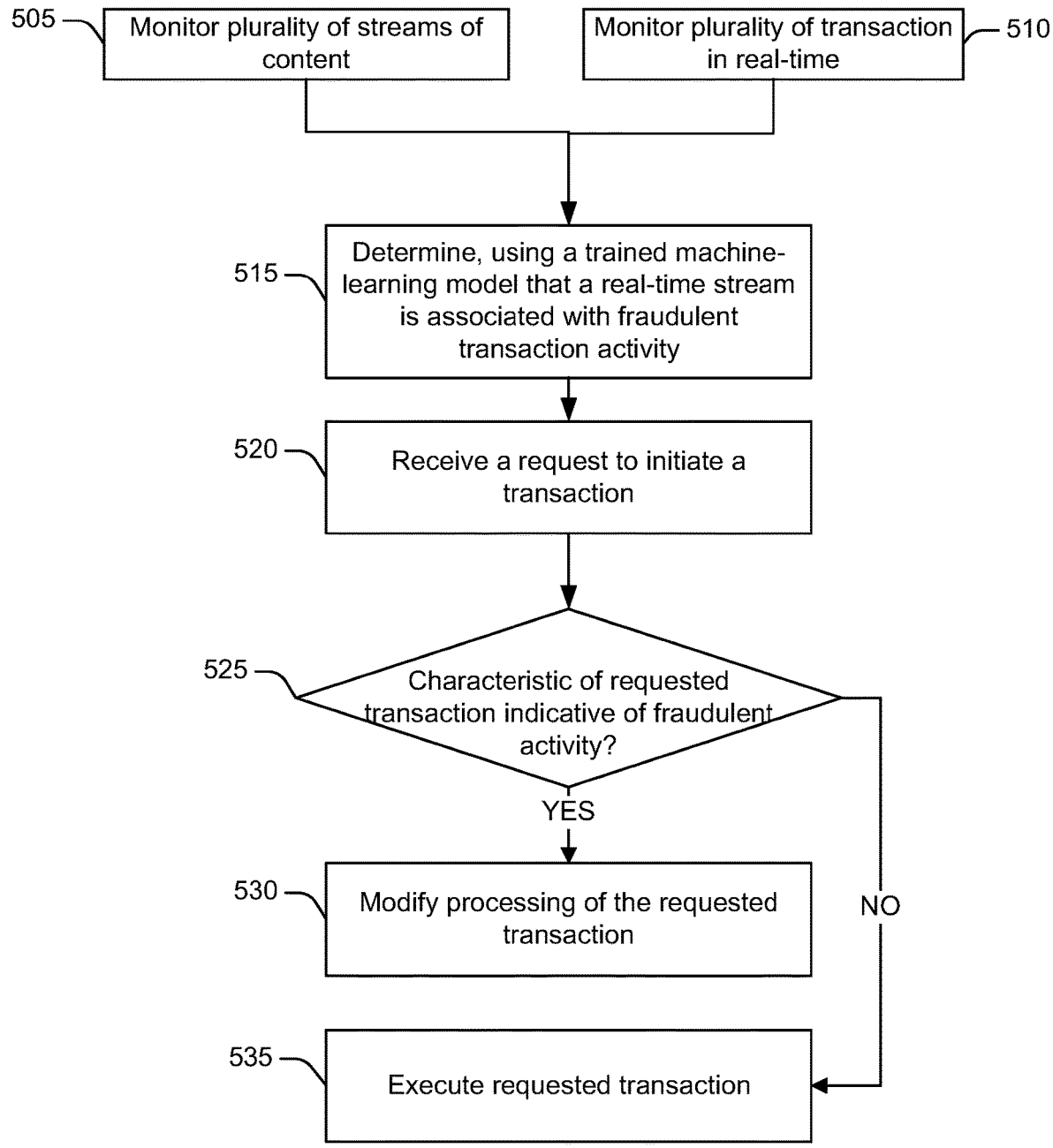
FIG. 5 illustrates an example process of managing transactions associated with detected potential scam or fraudulent activity according to some embodiments disclosed herein.

FIG. 5 is an example process 500 of managing transactions associated with detected potential scam or fraudulent activity. Steps are described below as being performed by individual functional components of the payment service system 106; however, additional or alternative functional components can perform the steps in additional or alternative examples.

At step 505, a payment service system 106 may monitor a plurality of streams of content using a stream monitoring component 117 as described herein.

At step 510, the payment service system 106 may monitor a plurality of transactions in real-time using a transaction monitoring component 123 as described herein.

At step 515, the payment service system 106 may use the monitored data from both the stream monitoring component 117 and the transaction monitoring component 123 to determine, using a trained machine-learning model that a real-time stream is associated with fraudulent transaction activity. The payment service system 106 may use a fraud management component 119 to manage the fraud indicators 132 and an account management component 121 to flag one or more destination addresses as suspicious or associated with fraudulent transaction activity.

At step 520, the payment service system 106 may receive a request to initiate a transaction. The payment service system 106 may receive the request to initiate the transaction using the transaction monitoring component 123. As an example and not by way of limitation, the payment service system 106 may receive a request to initiate a transaction from a user device 112 as described herein.

At step 525, the payment service system 106 may determine whether a characteristic of a requested transaction is indicative of fraudulent activity. In some examples, the payment service system 106 may use a transaction monitoring component 123 to determine whether a requested transaction is indicative of fraudulent activity. The payment service system 106 may use a machine-learning model to determine whether the requested transaction is indicative of fraudulent activity. As an example, the characteristic indicative of fraudulent activity can include the information associated with the intended recipient of the request transaction, such as the destination address or other recipient information. As another example, the characteristic indicative of fraudulent activity can include other contextual information, such as the amount or timing of the transaction that enables one or more machine-learning models used by the transaction monitoring component 123 to provide a determination with suitably high confidence that the transaction is associated with fraudulent activity. Other characteristics indicative of fraudulent activity are discussed herein.

At step 530, if the payment service system 106 determines that the requested transaction includes a characteristic indicative of fraudulent activity, then the payment service system 106 may modify the processing of the requested transaction as described herein. As an example and not by way of limitation, the payment service system 106 may generate an alternative destination address to temporarily hold the funds associated with the requested transaction until the receiving user verifies their identity. As another example and not by way of limitation, the payment service system 106 may provide one or more user interventions warning the user requesting the transaction of the characteristic indicative of fraudulent activity or requiring the user requesting the transaction to provide additional approval to initiate the transaction.

At step 535, if the payment service system 106 determines that the requested transaction does not include a characteristic indicative of fraudulent activity, then the payment service system 106 may execute the requested transaction.

Figure 6A:
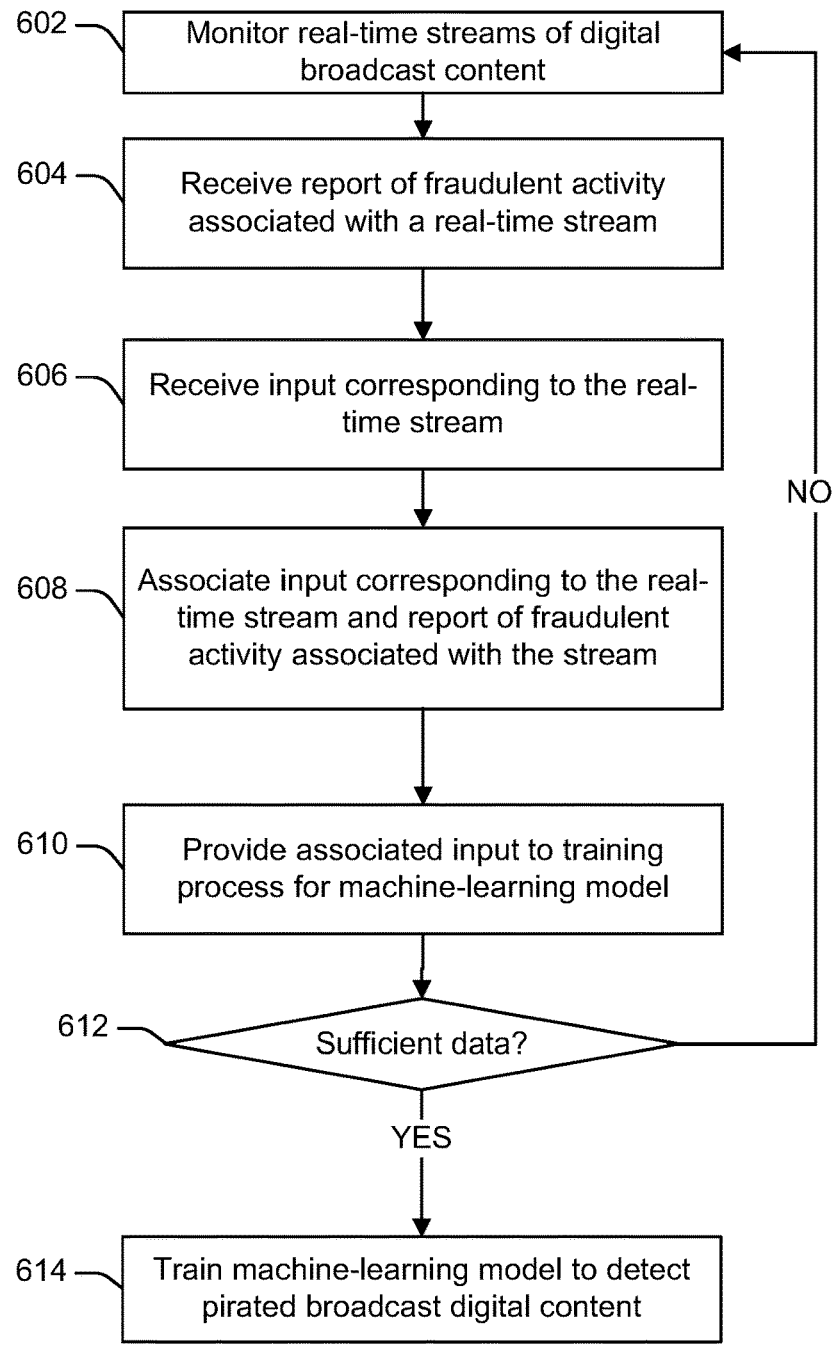
FIGS. 6A-6C illustrates an example process of detecting a destination address associated with a payment service that may be associated with fraudulent activity according to some embodiments disclosed herein.

FIG. 6A is an example process 600*a* of training a machine-learning model to detect when a broadcast digital content is pirated content. Steps are described below as being performed by individual functional components of the payment service system 106; however, additional or alternative functional components can perform the steps in additional or alternative examples.

At step 602, the payment service system 106 may monitor real-time streams of digital broadcast content. The payment service system 106 may use the stream monitoring component 117 to monitor real-time streams as described herein.

At step 604, the payment service system 106 may receive a report of fraudulent activity associated with a real-time stream. The report may be received from a user, such as a user watching the real-time stream, from the operator of a streaming service providing the real-time stream, or one or more other components of the streaming service of the payment service system 106. The payment service system 106 may receive the report using the stream monitoring component 117. The report may be generated from one or more users indicating that a real-time stream is associated with fraudulent activity. The stream monitoring component 117 may use a machine-learning model to determine whether a real-time stream is associated with fraudulent activity.

At step 606, the payment service system 106 may receive input corresponding to the real-time stream. As an example, input corresponding to the real-time stream can include the streaming service, the handle of the account responsible for the real-time stream, the content of the real-time stream, the age of the account responsible for the stream, and other related information as discussed herein.

At step 608, the payment service system 106 may associate the input corresponding to the real-time stream and the report of fraudulent activity associated with the real-time stream.

At step 610, the payment service system 106 may provide the associated input and information associated with the fraudulent activity to a training process for machine-learning model. One or more training processes appropriate for training the type of machine-learning models used by the payment service system 106 may be used.

At step 612, the payment service system 106 may determine whether the training process for the machine-learning model has sufficient data to train the machine-learning model. If the payment service system 106 determines that the machine-learning model has sufficient data, then the payment service system 106 may train the machine-learning model to detect pirated broadcast digital content at step 614. If the payment service system 106 determines that the machine-learning model does not have sufficient data, then the process 600*a* may return to step 602 to continue monitoring real-time stream of digital broadcast content and gather additional data.

Figure 6B:
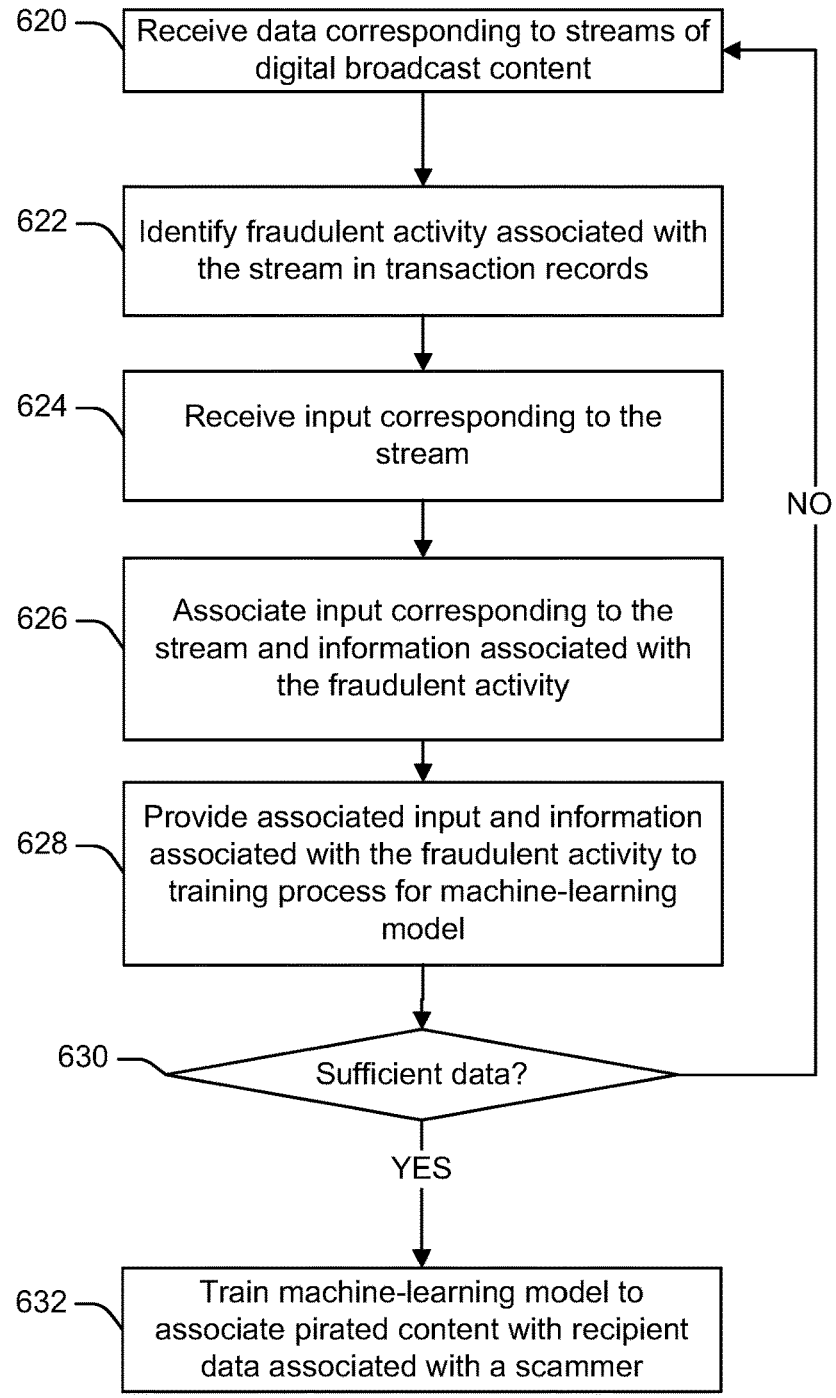

FIG. 6B is an example process 600*b* of training a machine-learning model to identify recipient data associated with a scammer, which in some examples, can be associated with pirated content. Steps are described below as being performed by individual functional components of the payment service system 106; however, additional or alternative functional components can perform the steps in additional or alternative examples.

At step 620, the payment service system 106 may receive data corresponding to streams of digital broadcast content. The payment service system 106 may use the stream monitoring component 117 to access data of streams of digital broadcast content as described herein. The payment service system 106 may use the stream monitoring component 117 to access previous real-time streams of digital broadcast content. In some examples, the data of streams of digital broadcast content can include a determination by a machine-learning model trained to detect pirated broadcast digital content.

At step 622, the payment service system 106 may identify fraudulent activity associated with the stream in transaction records. The payment service system 106 may identify one or more destination addresses to review based on the stream. The payment service system 106 may review the transaction records associated with the one or more destination addresses to identify known fraudulent activity. Information associated with the fraudulent activity can include the age of accounts (e.g., length of time active on the payment service), transaction activity associated with the accounts (e.g., recency of transactions, frequency of transactions, volume of transactions, timing of transactions, value of transactions, etc.), numbers of transactions requested to particular recipients in a defined period of time, and other related information as discussed herein.

At step 624, the payment service system 106 may receive input corresponding to the stream. As an example, input corresponding to the stream can include the content of the stream, determinations from one or more other machine-learning models trained to evaluate a stream as suspected pirated content as described above, the website hosting the stream, the quality of the stream, the handle of an accounts conducting the stream, the age of the account (e.g., length of time active on the streaming service) and other related information as discussed herein.

At step 626, the payment service system 106 may associate the input corresponding to the stream and information associated with the fraudulent activity.

At step 628, the payment service system 106 may provide the associated input and information associated with the fraudulent activity to a training process for machine-learning model. One or more training processes appropriate for training the type of machine-learning models used by the payment service system 106 may be used.

At step 630, the payment service system 106 may determine whether the machine-learning model has sufficient data to train the machine-learning model. If the payment service system 106 determines that the machine-learning model has sufficient data, then the payment service system 106 may train the machine-learning model to identify recipient data associated with a scammer, which in some examples, can be associated with pirated content, as shown at step 632. If the payment service system 106 determines that the machine-learning model does not have sufficient data, then the process 600*b* may return to step 602 to receive data corresponding to streams of digital broadcast content and gather additional data.

Figure 6C:
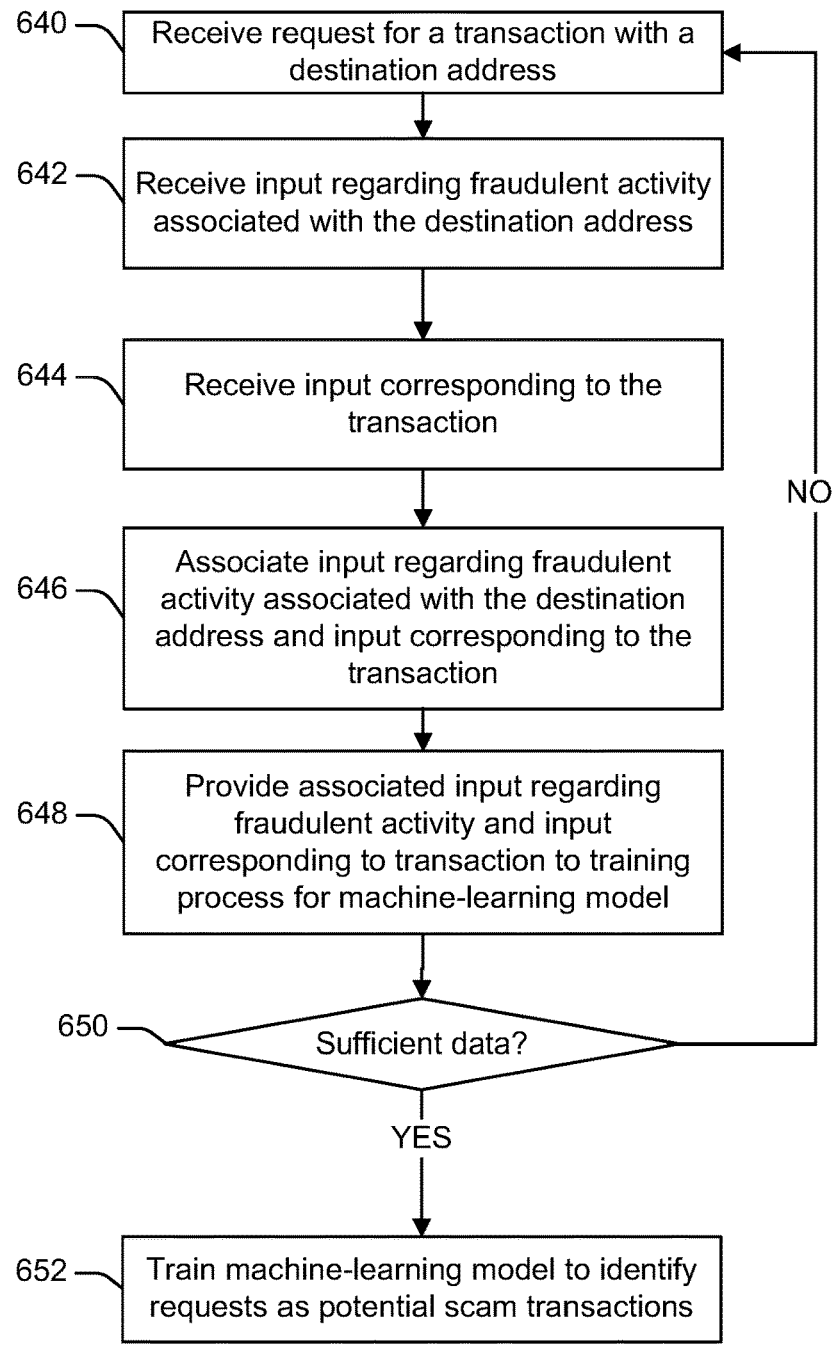

FIG. 6C is an example process 600*c* of training a machine-learning model to identify requests from unsuspecting users (e.g., potential victims) as potential scam transactions. Steps are described below as being performed by individual functional components of the payment service system 106; however, additional or alternative functional components can perform the steps in additional or alternative examples.

At step 640, the payment service system 106 may receive a request for a transaction with a destination address. The payment service system 106 may use the transaction monitoring component 123 to monitor transactions that occur in real-time as described herein. The payment service system 106 may use the transaction monitoring component 123 to access transactional data.

At step 642, the payment service system 106 may receive information regarding fraudulent activity associated with the destination address. The payment service system 106 may retrieve known instances of fraudulent activity associated with the destination address from a datastore 128. The information regarding fraudulent activity may include information corresponding to patterns of fraudulent activity, such as the amount associated with transaction, the number of associated transactions, the density of associated transaction (e.g., amount of associated transaction in a given period of time), the time that associated transactions are initiated or received, and other related information.

At step 644, the payment service system 106 may receive input corresponding to the transaction. As an example, input corresponding to the transaction can include a report indicating the destination address associated with the transaction is associated with fraudulent activity, one or more recipient identifiers, one or more prior transactions (e.g., associated with a recipient), amount of payment, type of payment, geolocations of sender and recipient, time of day, context (e.g., other applications running in the background, such as a streaming application), entry point (e.g., origination of the payment request, whether the payment request came from a first-party location or an external source, etc.), and other related information as discussed herein.

At step 646, the payment service system 106 may associate the input regarding fraudulent activity associated with the destination address and the input corresponding to the transaction.

At step 648, the payment service system 106 may provide the associated input regarding fraudulent activity and input corresponding to the transaction to a training process for machine-learning model. One or more training processes appropriate for training the type of machine-learning models used by the payment service system 106 may be used.

At step 650, the payment service system 106 may determine whether the machine-learning model has sufficient data to train the machine-learning model. If the payment service system 106 determines that the machine-learning model has sufficient data, then the payment service system 106 may train the machine-learning model to identify payment requests as potential scam transactions detect fraudulent transaction activity at step 654. If the payment service system 106 determines that the machine-learning model does not have sufficient data, then the process 600*c* may return to step 640 to receive requests for transactions and gather additional data.

In some examples, one or more inputs to a single machine-learning model of processes 600*a*-600*c* may be combined to generate one or more machine-learning model (s) that can flag a transaction as fraudulent.

Figure 7:
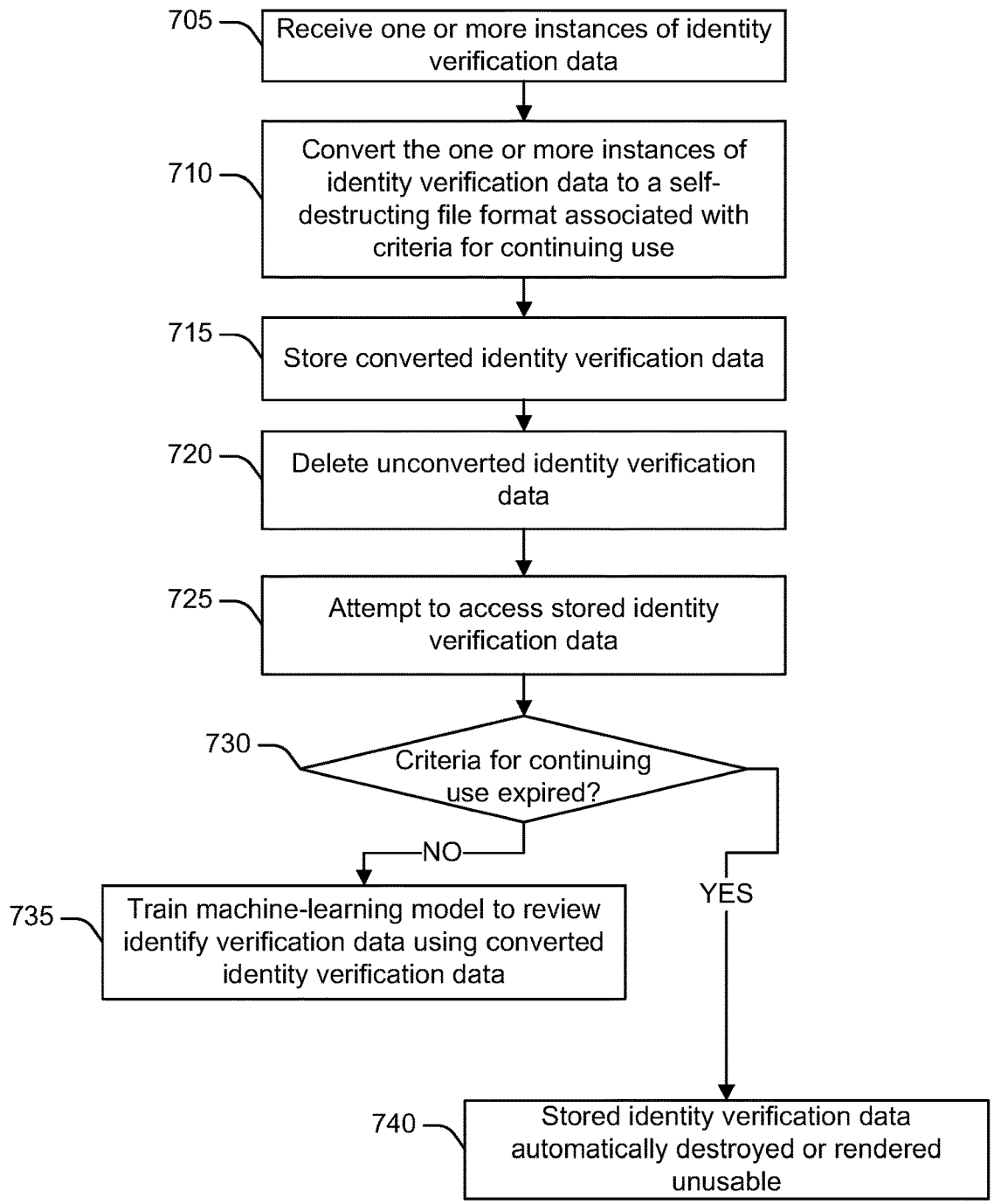
FIG. 7 illustrates an example process of verifying the identity of a user associated with detected potential scam or fraudulent activity according to some embodiments disclosed herein.

FIG. 7 is an example process 700 of verifying the identity of a user associated with detected potential scam or fraudulent activity. Steps are described below as being performed by individual functional components of the payment service system 106; however, additional or alternative functional components can perform the steps in additional or alternative examples.

At step 705, the payment service system 106 may receive one or more instances of identity verification data. In some examples, the payment service system 106 may receive the instance of identity verification data from a payment service application 110 on a user device 112. The one or more instances of identity verification data may include a captured image of photo identification of a user.

At step 710, the payment service system 106 may convert the one or more instances of identity verification data to a self-destructing file format associated with criteria for continuing user. As an example, the self-destructing file format may have criteria that specifies the file will be deleted after a predetermined number of accesses, or attempts to access, the identity verification data, or a predetermined time period.

At step 715, the payment service system 106 may store the converted identity verification data. As described herein, the payment service system 106 can store the identity verification data in a datastore 128 of the payment service system 106 for the purposes of future training of machine-learning models to assess identity verification data.

At step 720, the payment service system 106 may delete the unconverted identity verification data. The payment service system 106 may remove any instances of captured media or information not in the converted file format.

At step 725, the payment service system 106 may attempt to access stored identity verification data. At step 730 it is determined whether the criteria for continuing use for the stored identity verification data has expired. If the criteria for continuing use has not expired, then the process 700 continues to step 735, where the payment service system 106 uses the identity verification data to train the machine-learning model to review and assess identity verification data using the converted identity verification data. If the criteria for continuing use has expired, then the process 700 continues to step 740, where the identity verification data is automatically destroyed or otherwise rendered unusable by virtue of the properties of the self-destructing file format.

Figure 8:
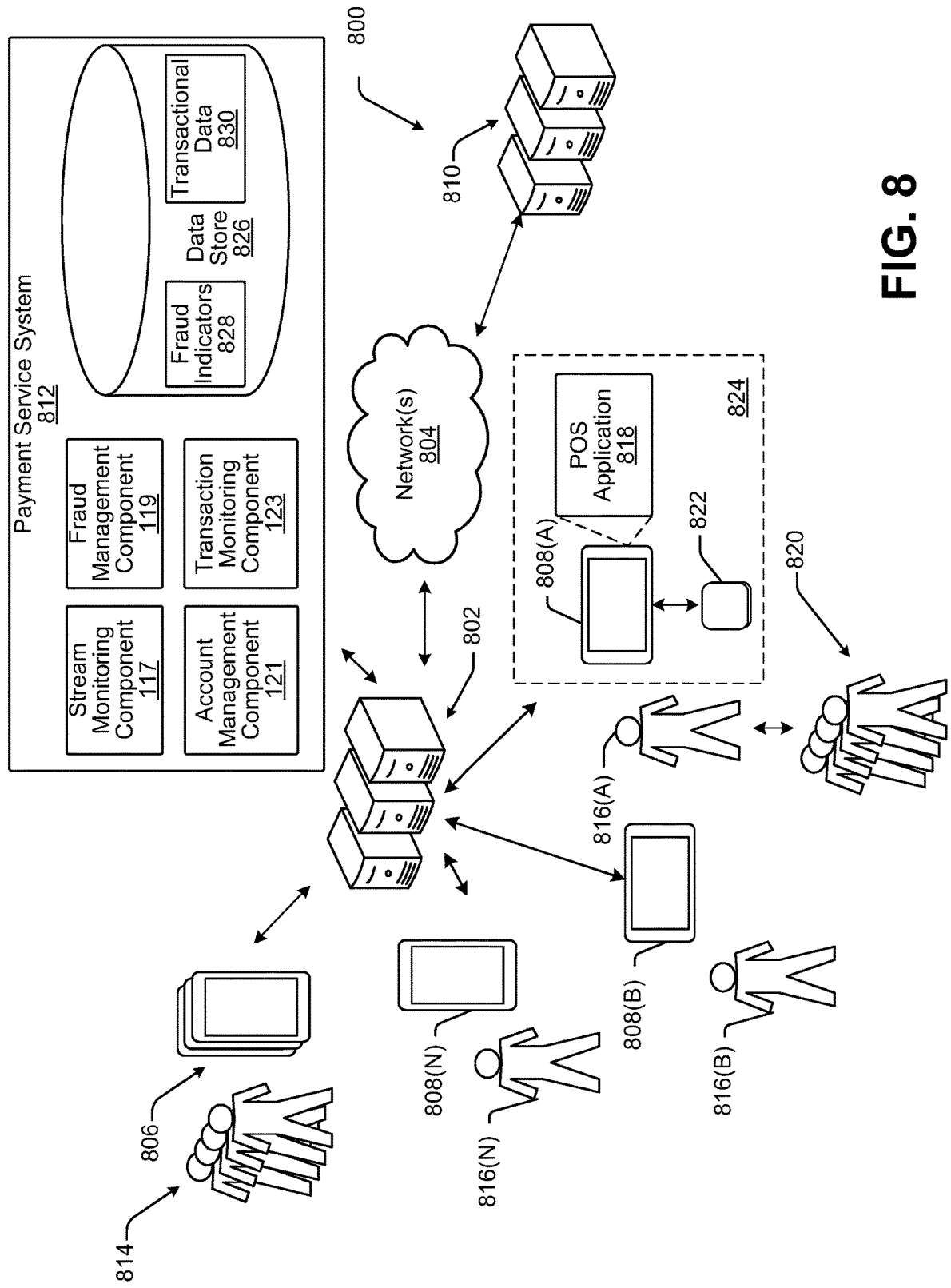
FIG. 8 illustrates an example environment for providing embodiments described herein.

FIG. 8 illustrates an example environment 800. The environment 800 includes server(s) 802 that can communicate over a network 804 with user devices 806 (which, in some examples can be merchant devices 808 (individually, 808(A)-808(N))) and/or server(s) 810 associated with third-party service provider(s). The server(s) 802 can be associated with a service provider that can provide one or more services for the benefit of users 814, as described below. Actions attributed to the service provider can be performed by the server(s) 802.

Certain elements of environment 100 described with respect to FIG. 1 correspond to similar elements described herein with respect to FIG. 8. For example, the server(s) 802 can correspond to server(s) 104, the network(s) 804 can correspond to the network(s) 108, the user device(s) 806 can correspond to any of the user device(s) 112, the servers 810 associated with the third-party service provider(s) can correspond to third-party servers 130, payment service system 812 can correspond to payment service system 106, the user(s) 814 can correspond to user(s) 114, etc.

Similar to server(s) 104, servers 802 can store one or more functional components that enable the payment service to perform operations as described herein. For example, the server(s) 802 can store a stream monitoring component 117, a fraud management component 119, an account management component 121, and a transaction monitoring component 123. Each component can function similarly to the respective components described in FIG. 1. In some examples, the payment service system 812 can store one or more functional components that enable the payment service to perform operations as described herein.

The environment 800 can include a plurality of user devices 806, as described above. Each one of the plurality of user devices 806 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 814. The users 814 can be referred to as customers, buyers, merchants, sellers, borrowers, employees, employers, payors, payees, couriers and so on. The users 814 can interact with the user devices 806 via user interfaces presented via the user devices 806. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 806 can have an instance or versioned instance of an application, which can be downloaded from an application store, for example, which can present the user interface(s) described herein. In at least one example, a user 814 can interact with the user interface via touch input, spoken input, or any other type of input.

As described above, in at least one example, the users 814 can include merchants 816 (individually, 816(A)-816(N)). In an example, the merchants 816 can operate respective merchant devices 808, which can be user devices 806 configured for use by merchants 816. For the purpose of this discussion, a "merchant" can be any entity that offers items (e.g., goods or services) for purchase or other means of acquisition (e.g., rent, borrow, barter, etc.). The merchants 816 can offer items for purchase or other means of acquisition via brick-and-mortar stores, mobile stores (e.g., pop-up shops, food trucks, etc.), online stores, combinations of the foregoing, and so forth. In some examples, at least some of the merchants 816 can be associated with a same entity but can have different merchant locations and/or can have franchise/franchisee relationships. In additional or alternative examples, the merchants 816 can be different merchants. That is, in at least one example, the merchant 816(A) is a different merchant than the merchant 816(B) and/or the merchant 816(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 808 can have an instance of a POS application 818 stored thereon. The POS application 818 can configure the merchant device 808 as a POS terminal, which enables the merchant 816(A) to interact with one or more customers 820. As described above, the users 814 can include customers, such as the customers 820 shown as interacting with the merchant 816(A). For the purpose of this discussion, a "customer" can be any entity that acquires items from merchants. While only two customers 820 are illustrated in FIG. 8, any number of customers 820 can interact with the merchants 816. Further, while FIG. 8 illustrates the customers 820 interacting with the merchant 816(A), the customers 820 can interact with any of the merchants 816.

In at least one example, interactions between the customers 820 and the merchants 816 that involve the exchange of funds (from the customers 820) for items (from the merchants 816) can be referred to as "transactions." In at least one example, the POS application 818 can determine transaction data associated with the POS transactions. Transaction data can include payment information, which can be obtained from a reader device 822 associated with the merchant device 808(A), user authentication data, purchase amount information, point-of-purchase information (e.g., item(s) purchased, date of purchase, time of purchase, etc.), etc. The POS application 818 can send transaction data to the server(s) 802 such that the server(s) 802 can track transactions of the customers 820, merchants 816, and/or any of the users 814 over time. Furthermore, the POS application 818 can present a UI to enable the merchant 816(A) to interact with the POS application 818 and/or the service provider via the POS application 818.

In at least one example, the merchant device 808(A) can be a special-purpose computing device configured as a POS terminal (via the execution of the POS application 818). In at least one example, the POS terminal may be connected to a reader device 822, which is capable of accepting a variety of payment instruments, such as credit cards, debit cards, gift cards, short-range communication based payment instruments, and the like, as described below. In at least one example, the reader device 822 can plug in to a port in the merchant device 808(A), such as a microphone port, a headphone port, an audio-jack, a data port, or other suitable port. In additional or alternative examples, the reader device 822 can be coupled to the merchant device 808(A) via another wired or wireless connection, such as via a Bluetooth®, BLE, and so on. Additional details are described below with reference to FIG. 11. In some examples, the reader device 822 can read information from alternative payment instruments including, but not limited to, wristbands and the like.

In some examples, the reader device 822 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 822, and communicate with the server(s) 802, which can provide, among other services, a payment processing service. The server(s) 802 associated with the service provider can communicate with server(s) 810, as described below. In this manner, the POS terminal and reader device 822 may collectively process transaction(s) between the merchants 816 and customers 820. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 822 of the POS system 824 are shown as separate devices, in additional or alternative examples, the POS terminal and the reader device 822 can be part of a single device. In some examples, the reader device 822 can have a display integrated therein for presenting information to the customers 820. In additional or alternative examples, the POS terminal can have a display integrated therein for presenting information to the customers 820. POS systems, such as the POS system 824, may be mobile, such that POS terminals and reader devices may process transactions in disparate locations across the world. POS systems can be used for processing card-present transactions and card-not-present (CNP) transactions, as described below.

A card-present transaction is a transaction where both a customer 820 and his or her payment instrument are physically present at the time of the transaction. Card-present transactions may be processed by swipes, dips, taps, or any other interaction between a physical payment instrument (e.g., a card), or otherwise present payment instrument, and a reader device 822 whereby the reader device 822 is able to obtain payment data from the payment instrument. A swipe is a card-present transaction where a customer 820 slides a card, or other payment instrument, having a magnetic strip through a reader device 822 that captures payment data contained in the magnetic strip. A dip is a card-present transaction where a customer 820 inserts a payment instrument having an embedded microchip (i.e., chip) into a reader device 822 first. The dipped payment instrument remains in the payment reader until the reader device 822 prompts the customer 820 to remove the card, or other payment instrument. While the payment instrument is in the reader device 822, the microchip can create a one-time code which is sent from the POS system 824 to the server(s) 810 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 820 may tap or hover his or her payment instrument (e.g., card, electronic device such as a smart phone running a payment application, etc.) over a reader device 822 to complete a transaction via short-range communication (e.g., NFC, RFID, Bluetooth®, BLE, etc.). Short-range communication enables the payment instrument to exchange information with the reader device 822. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 824, the server(s) 802, and/or the server(s) 810 may exchange payment information and transaction data to determine whether transactions are authorized. For example, the POS system 824 may provide encrypted payment data, user authentication data, purchase amount information, point-of-purchase information, etc. (collectively, transaction data) to server(s) 802 over the network(s) 804. The server(s) 802 may send the transaction data to the server(s) 810. As described above, in at least one example, the server(s) 810 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 810 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 810 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 810 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 810 associated therewith), and a payment authorization message is communicated from the issuer to the POS device via a path opposite of that described above, or via an alternate path.

The payment service 812 can access a datastore 826 (e.g., datastore 128) to access one or more fraud indicators 828 or transactional data 830. The one or more fraud indicators 828 can flag one or more destination addresses as being associated with fraudulent behavior. The transactional data 830 may be used to train a machine-learning model to identify fraudulent behavior.

As described above, the server(s) 810, which can be associated with payment service provider(s), may determine whether the transaction is authorized based on the transaction data, as well as information relating to parties to the transaction (e.g., the customer 820 and/or the merchant 816(A)). The server(s) 810 may send an authorization notification over the network(s) 804 to the server(s) 802, which may send the authorization notification to the POS system 824 over the network(s) 804 to indicate whether the transaction is authorized. The server(s) 802 may also transmit additional information such as transaction identifiers to the POS system 824. In one example, the server(s) 802 may include a merchant application and/or other functional components for communicating with the POS system 824 and/or the server(s) 810 to authorize or decline transactions.

Based on the authentication notification that is received by the POS system 824 from server(s) 802, the merchant 816(A) may indicate to the customer 820 whether the transaction has been approved. In some examples, approval may be indicated at the POS system 824, for example, at a display of the POS system 824. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 814 can access all of the services of the service provider. In other examples, the users 814 can have gradated access to the services, which can be based on risk tolerance, IDV outputs, subscriptions, and so on. In at least one example, access to such services can be availed to the merchants 816 via the POS application 818. In additional or alternative examples, each service can be associated with its own access point (e.g., application, web browser, etc.).

The service provider can offer payment processing services for processing payments on behalf of the merchants 816, as described above. For example, the service provider can provision payment processing software, payment processing hardware and/or payment processing services to merchants 816, as described above, to enable the merchants 816 to receive payments from the customers 820 when conducting POS transactions with the customers 820. For instance, the service provider can enable the merchants 816 to receive cash payments, payment card payments, and/or electronic payments from customers 820 for POS transactions and the service provider can process transactions on behalf of the merchants 816.

As the service provider processes transactions on behalf of the merchants 816, the service provider can maintain accounts or balances for the merchants 816 in one or more ledgers. For example, the service provider can analyze transaction data received for a transaction to determine an amount of funds owed to a merchant 816(A) for the transaction. In at least one example, such an amount can be a total purchase price less fees charged by the service provider for providing the payment processing services. Based on determining the amount of funds owed to the merchant 816(A), the service provider can deposit funds into an account of the merchant 816(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 816(A) to a bank account of the merchant 816(A) that is held at a bank or other financial institution (e.g., associated with the server(s) 810). Scheduled deposits can occur at a prearranged time after a POS transaction is funded, which can be a business day after the POS transaction occurred, or sooner or later. In some examples, the merchant 816(A) can access funds prior to a scheduled deposit. For instance, the merchant 816(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 816(A) can have a payment instrument that is linked to the stored balance that enables the merchant to access the funds without first transferring the funds from the account managed by the service provider to the bank account of the merchant 816(A).

In at least one example, the service provider may provide inventory management services. That is, the service provider may provide inventory tracking and reporting. Inventory management services may enable the merchant 816(A) to access and manage a database storing data associated with a quantity of each item that the merchant 816(A) has available (i.e., an inventory). Furthermore, in at least one example, the service provider can provide catalog management services to enable the merchant 816(A) to maintain a catalog, which can be a database storing data associated with items that the merchant 816(A) has available for acquisition (i.e., catalog management services). In at least one example, the catalog may include a plurality of data items and a data item of the plurality of data items may represent an item that the merchant 816(A) has available for acquisition. The service provider can offer recommendations related to pricing of the items, placement of items on the catalog, and multi-party fulfillment of the inventory.

In at least one example, the service provider can provide business banking services, which allow the merchant 816(A) to track deposits (from payment processing and/or other sources of funds) into an account of the merchant 816(A), payroll payments from the account (e.g., payments to employees of the merchant 816(A)), payments to other merchants (e.g., business-to-business) directly from the account or from a linked debit card, withdrawals made via scheduled deposit and/or instant deposit, etc. Furthermore, the business banking services can enable the merchant 816(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 816 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 816. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 812 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 814 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 816. In at least one example, the service provider can recommend and/or generate content items to supplement omni-channel presences of the merchants 816. That is, if a merchant of the merchants 816 has a web page, the service provider—via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 814 to set schedules for scheduling appointments and/or users 814 to schedule appointments.

In some examples, the service provider can provide restaurant management services to enable users 814 to make and/or manage reservations, to monitor front-of-house and/or back-of-house operations, and so on. In such examples, the merchant device(s) 808 and/or server(s) 802 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 814 who can travel between locations to perform services for a requesting user 814 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 806.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 814, voice inputs into a virtual assistant or the like, to determine intents of user(s) 814. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 814 may be new to the service provider such that the user 814 that has not registered (e.g., subscribed to receive access to one or more services offered by the service provider) with the service provider. The service provider can offer onboarding services for registering a potential user 814 with the service provider. In some examples, onboarding can involve presenting various questions, prompts, and the like to a potential user 814 to obtain information that can be used to generate a profile for the potential user 814. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 814 providing all necessary information, the potential user 814 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 810). That is, the service provider can offer IDV services to verify the identity of users 814 seeking to use or using their services. Identity verification requests a customer (or potential customer) to provide information that is used by compliance departments to prove that the information is associated with an identity of a real person or entity. In at least one example, the service provider can perform services for determining whether identifying information provided by a user 814 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 810 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 802) and/or the server(s) 810 via the network(s) 804. In some examples, the merchant device(s) 808 are not capable of connecting with the service provider (e.g., the server(s) 802) and/or the server(s) 810, due to a network connectivity issue, for example. In additional or alternative examples, the server(s) 802 are not capable of communicating with the server(s) 810 due to network connectivity issue, for example. In such examples, devices may operate in "offline" mode where at least some payment data is stored (e.g., on the merchant device(s) 808) and/or the server(s) 802 until connectivity is restored and the payment data can be transmitted to the server(s) 802 and/or the server(s) 810 for processing.

In at least one example, the service provider can be associated with a hub, such as an order hub, an inventory hub, a fulfillment hub and so on, which can enable integration with one or more additional service providers (e.g., associated with the additional server(s) 810). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 806 that are in communication with server(s) 802 of the service provider. That is, techniques described herein are directed to a specific implementation—or, a practical application—of utilizing a distributed system of user devices 806 that are in communication with server(s) 802 of the service provider to perform a variety of services, as described above. The unconventional configuration of the distributed system described herein enables the server(s) 802 that are remotely-located from end-users (e.g., users 814) to intelligently offer services based on aggregated data associated with the end-users, such as the users 814 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 814 and user devices 806. Furthermore, such features are changed dynamically based on the profiles of the users involved interacting with the GUIs. As such, techniques described herein are directed to improvements to computing systems.

Figure 9:
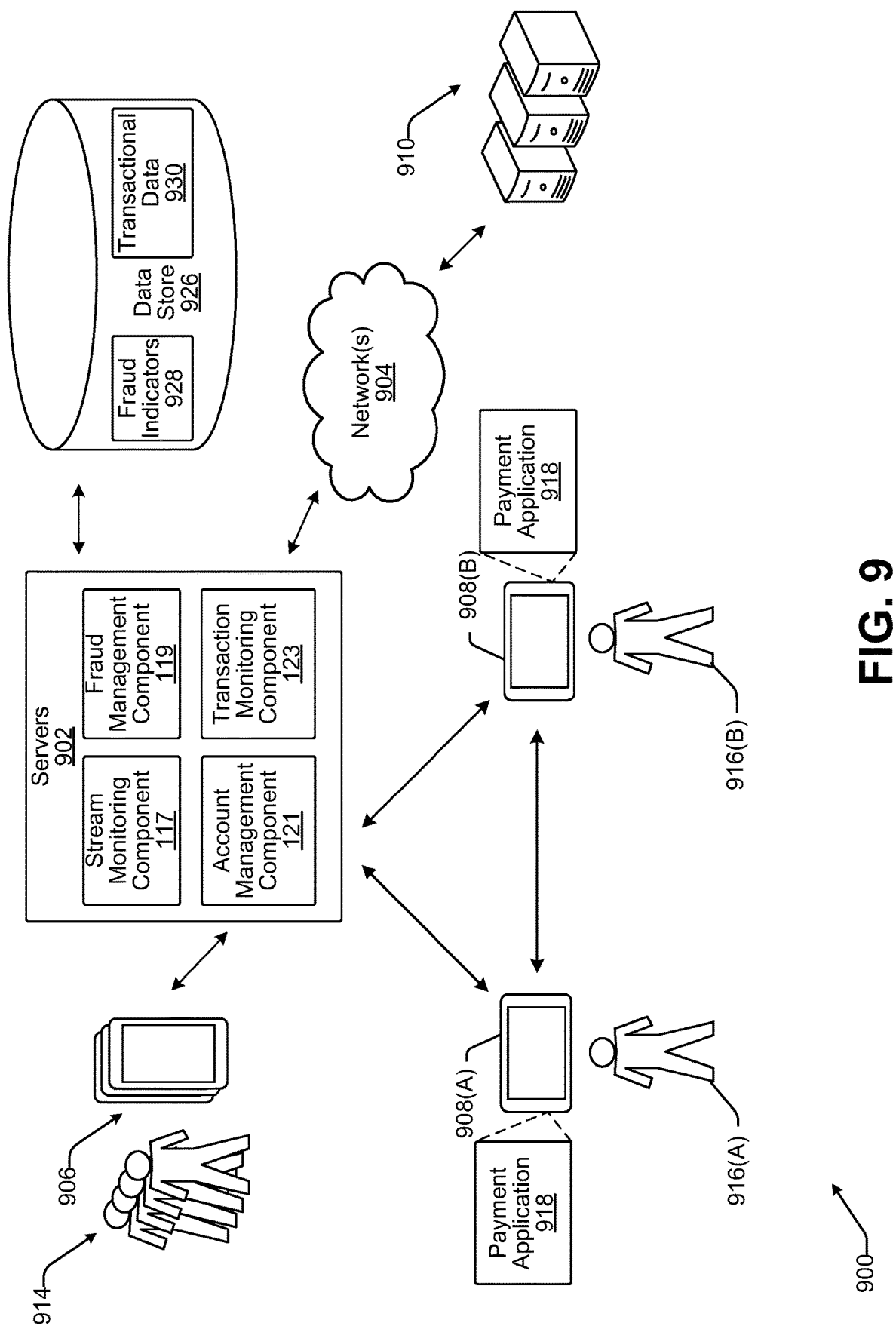
FIG. 9 illustrates another example environment for providing embodiments described herein.

FIG. 9 illustrates an example environment 900. The environment 900 includes server(s) 902 that can communicate over a network 904 with user devices 906 (which, in some examples can be user devices 908 (individually, 908(A), 908(B)) and/or server(s) 910 associated with third-party service provider(s). The server(s) 902 can be associated with a service provider that can provide one or more services for the benefit of users 914, as described below. Actions attributed to the service provider can be performed by the server(s) 902. In some examples, the service provider referenced in FIG. 8 can be the same or different than the service provider referenced in FIG. 9.

Certain elements of environment 100 described with respect to FIG. 1 correspond to similar elements described herein with respect to FIG. 9. For example, the server(s) 902 can correspond to server(s) 104, the network(s) 904 can correspond to the network(s) 108, the user device(s) 906 can correspond to any of the user device(s) 112, the servers 910 associated with the third-party service provider(s) can correspond to third-party servers 130, the user(s) 914 can correspond to user(s) 114, etc.

Similar to server(s) 104, servers 902 can store one or more functional components that enable the payment service to perform operations as described herein. For example, the server(s) 902 can store a stream monitoring component 117, a fraud management component 119, an account management component 121, and a transaction monitoring component 123. Each component can function similarly to the respective components described in FIG. 1. The servers 902 can access a datastore 926 (e.g., datastore 128) to access one or more fraud indicators 928 or transactional data 930. The one or more fraud indicators 928 can flag one or more destination addresses as being associated with fraudulent behavior. The transactional data 930 may be used to train a machine-learning model to identify fraudulent behavior.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

In at least one example, the service provider can provide a peer-to-peer payment service that enables peer-to-peer payments between two or more users 914. Two users, user 916(A) and user 916(B) are illustrated in FIG. 9 as "peers" in a peer-to-peer payment. In at least one example, the service provider can communicate with instances of a payment application 918 (or other access point) installed on devices 906 configured for operation by users 914. In an example, an instance of the payment application 918 executing on a first device 908(A) operated by a payor (e.g., user 916(A)) can send a request to the service provider to transfer an asset (e.g., fiat currency, non-fiat currency, digital assets, cryptocurrency, securities, gift cards, and/or related assets) from the payor to a payee (e.g., user 916(B)) via a peer-to-peer payment. In some examples, assets associated with an account of the payor are transferred to an account of the payee. In some examples, assets can be held at least temporarily in an account of the service provider prior to transferring the assets to the account of the payee.

Figure 10:
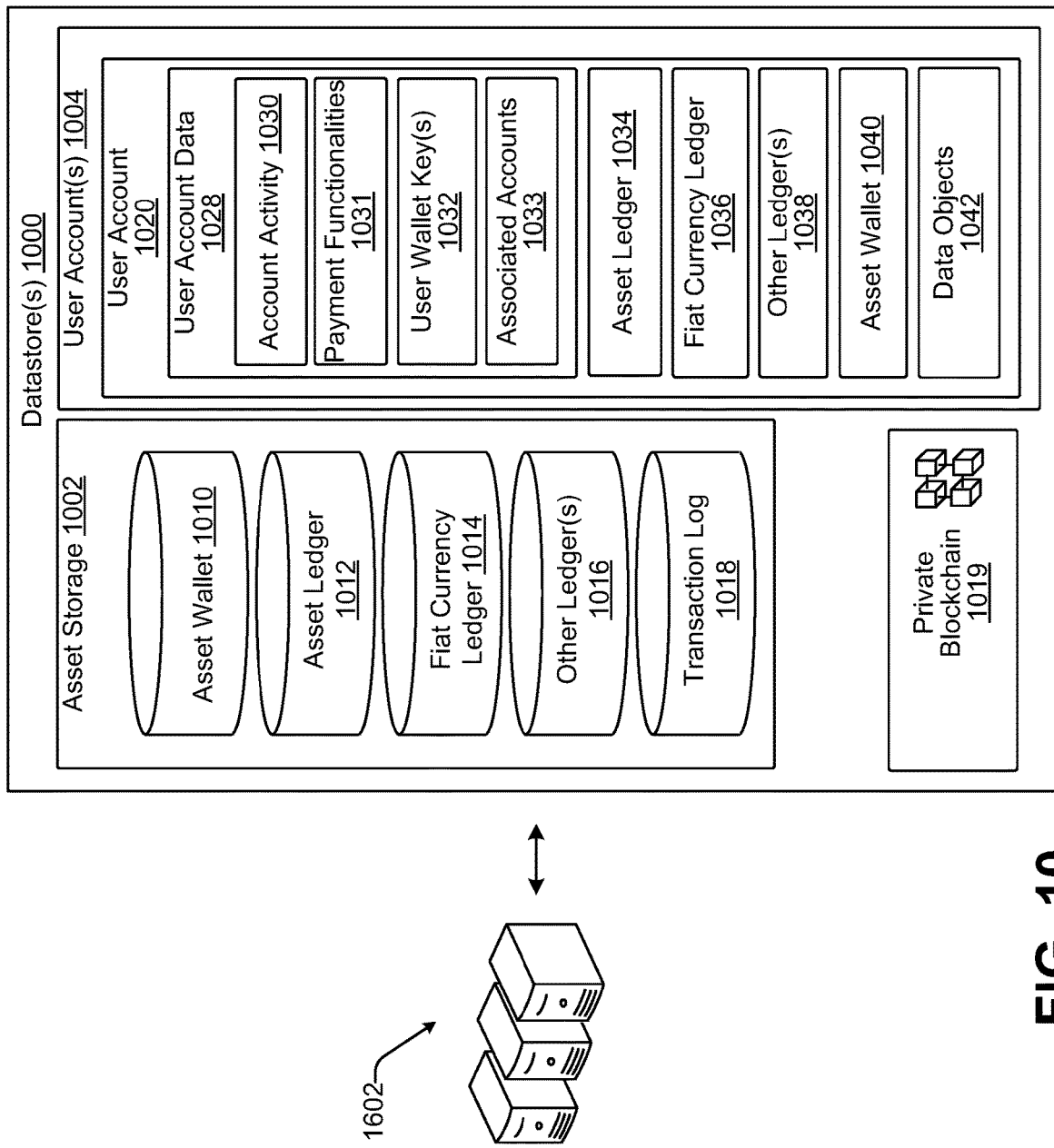
FIG. 10 illustrates an example datastore for providing embodiments described herein.

In some examples, the service provider can utilize a ledger system to track transfers of assets between users 914. FIG. 10, below, provides additional details associated with such a ledger system. The ledger system can enable users 914 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 918 executing on user device(s) of payee(s). As an example, the service provider can transfer assets from an account of user 916(A) to an account of the user 916(B) and can send a notification to the user device 908(B) of the user 916(B) for presentation via a user interface. The notification can indicate that a transfer is in process, a transfer is complete, or the like. In some examples, the service provider can send additional or alternative information to the instances of the payment application 918 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some examples, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 902 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 918 executing on the user devices 906. In at least some examples, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 9 or a third-party service provider associated with the server(s) 910. In examples where the content provider is a third-party service provider, the server(s) 910 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some examples, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 9. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 906 (e.g., mobile device or conventional personal computer (PC)) based on instructions transmitted to and from the server(s) 902 (which, in such an example can be called a "messaging server"). In some instances, the messaging application can include a payment application with messaging capability that enables users of the payment application to communicate with one another. In such instances, the payment application can be executed on a user device 906 based on instructions transmitted to and from the server(s) 902 (e.g., the payment service discussed in this description or another payment service that supports payment transactions). In some examples, the messaging application can be provided by a third-party service provider associated with the server(s) 910. In examples where the messaging application is a third-party service provider, the server(s) 910 can be accessible via one or more APIs or other integrations.

As described above, the service provider can facilitate peer-to-peer transactions, which can enable users 914 to transfer fiat currency, non-fiat currency, cryptocurrency, securities, or other assets, or portions thereof, to other users 914. In at least one example, individual users can be associated with accounts. Additional details associated with accounts and the transfer of assets between users 914 are described below with reference to FIG. 10.

Furthermore, the service provider of FIG. 9 can enable users 914 to perform banking transactions via instances of the payment application 918. For example, users can configure direct deposits or other deposits for adding assets to their various ledgers/balances. Further, users 914 can configure bill pay, recurring payments, and/or the like using assets associated with their accounts. In addition to sending and/or receiving assets via peer-to-peer transactions, users 914 buy and/or sell assets via asset networks such as cryptocurrency networks, securities networks, and/or the like.

FIG. 10 illustrates example datastore(s) 1000 that can be associated with the server(s) 902.

In at least one example, the datastore(s) 1000 can store assets in an asset storage 1002, as well as data in account(s) 1004. In some examples, account(s) 1004 can include merchant account(s) 1006, and/or customer account(s) 1008. In at least one example, the asset storage 1002 can be used to store assets managed by the service provider of FIG. 9. In at least one example, the asset storage 1002 can be used to record whether individual of the assets are registered to users. For example, the asset storage 1002 can include an asset wallet 1010 for storing records of assets owned by the service provider of FIG. 9, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 910 can be associated therewith. In some examples, the asset wallet 1010 can communicate with the asset network via one or more components associated with the server(s) 902.

The asset wallet 1010 can be associated with one or more addresses and can vary addresses used to acquire assets (e.g., from the asset network(s)) so that its holdings are represented under a variety of addresses on the asset network. In examples where the service provider of FIG. 9 has its own holdings of cryptocurrency (e.g., in the asset wallet 1010), a user can acquire cryptocurrency directly from the service provider of FIG. 9. In some examples, the service provider of FIG. 9 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1002 may contain ledgers that store records of assignments of assets to users 914. Specifically, the asset storage 1002 may include asset ledger 1010, fiat currency ledger 1014, and other ledger(s) 1016, which can be used to record transfers of assets between users 914 of the service provider and/or one or more third-parties (e.g., merchant network(s), payment card network(s), ACH network(s), equities network(s), the asset network, securities networks, etc.). In doing so, the asset storage 1002 can maintain a running balance of assets managed by the service provider of FIG. 9. The ledger(s) of the asset storage 1002 can further indicate some of the running balance for each of the ledger(s) stored in the asset storage 1002 is assigned or registered to one or more account(s) 1004.

In at least one example, the asset storage 1002 can include transaction logs 1018, which can include records of past transactions involving the service provider of FIG. 9. In at least one example, transaction data, as described herein, can be stored in association with the transaction logs 1018.

In some examples, the datastore(s) 1000 can store a private blockchain 1019. A private blockchain 1019 can function to record sender addresses, recipient data, public keys, values of cryptocurrency transferred, and/or can be used to verify ownership of cryptocurrency tokens to be transferred. In some examples, the service provider of FIG. 9 can record transactions taking place within the service provider of FIG. 9 involving cryptocurrency until the number of transactions has exceeded a determined limit (e.g., number of transactions, storage space allocation, etc.). Based at least in part on determining that the limit has been reached, the service provider of FIG. 9 can publish the transactions in the private blockchain 1019 to a public blockchain (e.g., associated with the asset network), where miners can verify the transactions and record the transactions to blocks on the public blockchain. In at least one example, the service provider of FIG. 9 can participate as miner(s) at least for its transactions to be posted to the public blockchain.

In at least one example, the datastore(s) 1000 can store and/or manage accounts, such as account(s) 1004, merchant account(s) 1006, and/or customer account(s) 1008. In at least one example, the account(s) 1004 may store records of accounts associated with the users 914. In at least one example, the account(s) 1004 can include an account 1020, which can be associated with a user (of the users 914). Other accounts of the account(s) 1004 can be similarly structured to the account 1020, according to some examples. In other examples, other accounts may include more or less data and/or account information than that provided by the account 1020. In at least one example, the account 1020 can include account data 1028, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the account data 1028 can include account activity 1030 and user wallet key(s) 1032. The account activity 1030 may include a transaction log for recording transactions associated with the account 1020. In some examples, the user wallet key(s) 1032 can include a public-private key-pair and a respective address associated with the asset network or other asset networks. In some examples, the user wallet key(s) 1032 may include one or more key pairs, which can be unique to the asset network or other asset networks.

In addition to the account data 1028, the account 1020 can include ledger(s) for account(s) managed by the service provider of FIG. 9, for the user. For example, the account 1020 may include an asset ledger 1034, a fiat currency ledger 1036, and/or one or more other ledgers 1038. The ledger(s) can indicate that a corresponding user utilizes the service provider of FIG. 9 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 9.

In some examples, the asset ledger 1034 can store a balance for each of one or more cryptocurrencies (e.g., Bitcoin, Ethereum, Litecoin, etc.) registered to the account 1020. In at least one example, the asset ledger 1034 can further record transactions of cryptocurrency assets associated with the account 1020. For example, the account 1020 can receive cryptocurrency from the asset network using the user wallet key(s) 1032. In some examples, the user wallet key(s) 1032 may be generated for the user upon request. User wallet key(s) 1032 can be requested by the user in order to send, exchange, or otherwise control the balance of cryptocurrency held by the service provider of FIG. 9 (e.g., in the asset wallet 1010) and registered to the user. In some examples, the user wallet key(s) 1032 may not be generated until an account requests such. This on-the-fly wallet key generation provides enhanced security features for users, reducing the number of access points to an account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 9 and the value is credited as a balance in asset ledger 1034), by purchasing currency in the form associated with the account using currency in a different form (e.g., buying a value of cryptocurrency from the service provider of FIG. 9 using a value of fiat currency reflected in fiat currency ledger 1036, and crediting the value of cryptocurrency in asset ledger 1034), or by conducting a transaction with another user (customer or merchant) of the service provider of FIG. 9 wherein the account receives incoming currency (which can be in the form associated with the account or a different form, in which the incoming currency may be converted to the form associated with the account). In some examples, the account data 1028 can include preferences for maintaining balances of individual of the ledgers. For example, the service provider of FIG. 9 can automatically debit the fiat currency ledger 1036 to increase the asset ledger 1034, or another account associated with the user whenever the cryptocurrency balance (e.g., of the asset ledger 1034) falls below a stated level (e.g., a threshold). Conversely, in some examples, the service provider of FIG. 9 can automatically credit the fiat currency ledger 1036 to decrease the asset ledger 1034 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party unrelated to the service provider of FIG. 9 (i.e., an external account). In at least one example, the user can transfer all or a portion of a balance of the cryptocurrency stored in the third-party cryptocurrency wallet to the service provider of FIG. 9. Such a transaction can request the user to transfer an amount of the cryptocurrency in a message signed by user's private key to an address provided by the service provider of FIG. 9. In at least one example, the transaction can be sent to miners to bundle the transaction into a block of transactions and to verify the authenticity of the transactions in the block. Once a miner has verified the block, the block is written to a public, distributed blockchain where the service provider of FIG. 9 can then verify that the transaction has been confirmed and can credit the user's asset ledger 1034 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 9. As described above, in some examples, the service provider of FIG. 9 can acquire cryptocurrency from a third-party source. In such examples, the asset wallet 1010 can be associated with different addresses and can vary addresses used to acquire cryptocurrency so that its holdings are represented under a variety of addresses on a blockchain. When the service provider of FIG. 9 has their own holdings of cryptocurrency, users can acquire cryptocurrency directly from the service provider of FIG. 9. In some examples, the service provider of FIG. 9 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 9 has its own cryptocurrency assets, cryptocurrency transferred in a transaction (e.g., data with address provided for receipt of transaction and a balance of cryptocurrency transferred in the transaction) can be stored in the asset wallet 1010. In at least one example, the service provider of FIG. 9 can credit the asset ledger 1034 of the user. Additionally, while the service provider of FIG. 9 recognizes that the user retains the value of the transferred cryptocurrency through crediting the asset ledger 1034, any person that inspects the blockchain will see the cryptocurrency as having been transferred to the service provider of FIG. 9. In some examples, the asset wallet 1010 can be associated with many different addresses. In such examples, any person that inspects the blockchain may not easily associate all cryptocurrency stored in asset wallet 1010 as belonging to the same entity. It is this presence of a private ledger that is used for real-time transactions and maintained by the service provider of FIG. 9, combined with updates to the public ledger at other times, that allows for extremely fast transactions using cryptocurrency to be achieved. In some examples, the "private ledger" can refer to the asset ledger 1010, which in some examples, can utilize the private blockchain 1019, as described herein. The "public ledger" can correspond to a public blockchain associated with the asset network.

In at least one example, a user's asset ledger 1034, fiat currency ledger 1036, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1034. In some examples, a user can receive fiat currency or another currency in the form of payment for a transaction with another user. In at least one example, at least a portion of such funds can be converted into cryptocurrency by the service provider of FIG. 9 and used to fund the asset ledger 1034 of the user.

As addressed above, in some examples, users can also have other accounts maintained by the service provider of FIG. 9. For example, a user can also have an account in U.S. dollars, which can be tracked, for example, via the fiat currency ledger 1036. Such an account can be funded by transferring money from a bank account at a third-party bank to an account maintained by the service provider of FIG. 9 as is conventionally known. In some examples, a user can receive fiat currency in the form of payment for a transaction with another user. In such examples, at least a portion of such funds can be used to fund the fiat currency ledger 1036.

In some examples, a user can have one or more internal payment cards registered with the service provider of FIG. 9. Internal payment cards can be linked to one or more of the accounts associated with the account 1020. In some examples, options with respect to internal payment cards can be adjusted and managed using an application (e.g., the payment application 918).

In at least one example, as described above, each ledger can correspond to an account of the user that is managed by the service provider of FIG. 9. In at least one example, individual of the accounts can be associated with a wallet or a stored balance for use in payment transactions, peer-to-peer transactions, payroll payments, etc.

In at least one example, the account 1020 can be associated with an asset wallet 1040. The asset wallet 1040 of the user can be associated with account information that can be stored in the account data 1028 and, in some examples, can be associated with the user wallet key(s) 1032. In at least one example, the asset wallet 1040 can store data indicating an address provided for receipt of a cryptocurrency transaction. In at least one example, the balance of the asset wallet 1040 can be based at least in part on a balance of the asset ledger 1034. In at least one example, funds availed via the asset wallet 1040 can be stored in the asset wallet 1040 or the asset wallet 1010. Funds availed via the asset wallet 1010 can be tracked via the asset ledger 1034. The asset wallet 1040, however, can be associated with additional cryptocurrency funds.

In at least one example, when the service provider of FIG. 9 includes a private blockchain 1019 for recording and validating cryptocurrency transactions, the asset wallet 1040 can be used instead of, or in addition to, the asset ledger 1034. For example, at least one example, a merchant can provide the address of the asset wallet 1040 for receiving payments. In an example where a customer is paying in cryptocurrency and the customer has their own cryptocurrency wallet account associated with the service provider of FIG. 9, the customer can send a message signed by its private key including its wallet address (i.e., of the customer) and identifying the cryptocurrency and value to be transferred to the merchant's asset wallet 1040. The service provider of FIG. 9 can complete the transaction by reducing the cryptocurrency balance in the customer's cryptocurrency wallet and increasing the cryptocurrency balance in the merchant's asset wallet 1040. In addition to recording the transaction in the respective cryptocurrency wallets, the transaction can be recorded in the private blockchain 1019 and the transaction can be confirmed. A user can perform a similar transaction with cryptocurrency in a peer-to-peer transaction as described above. In at least one example, the cryptocurrency wallet account 1030 can be funded by a balance transfer from a third-party cryptocurrency wallet, as described above. Such a transaction can re3uire a user to transfer an amount of cryptocurrency in a message signed by the user's private key to an address of the cryptocurrency wallet account 1030. The transferred amount of cryptocurrency can then be within the cryptocurrency wallet account 1030 for use in later transactions.

While the asset ledger 1034 and/or asset wallet 1040 are each described above with reference to cryptocurrency, the asset ledger 1034 and/or asset wallet 1040 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 9 is an aspect of the technology disclosed that enables technical advantages of increased processing speed and improved security.

Figure 11:
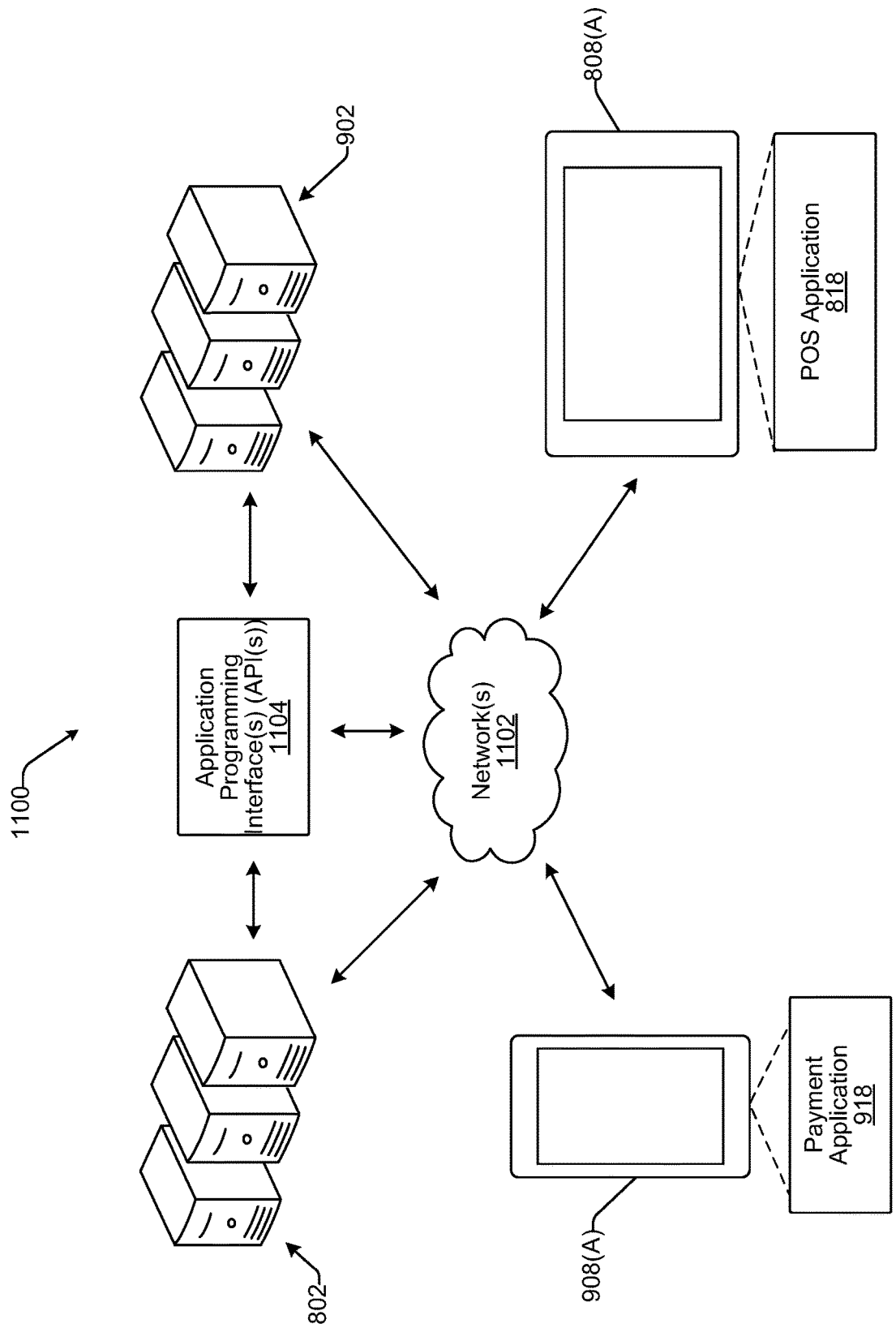
FIG. 11 illustrates another example environment for providing embodiments described herein.

FIG. 11 illustrates an example environment 1100 wherein the environment 800 and the environment 900 can be integrated to enable payments at the point-of-sale using assets associated with accounts in the peer-to-peer environment of FIG. 9. As illustrated, each of the components can communicate with one another via one or more networks 1102. In some examples, one or more APIs 1104 or other functional components can be used to facilitate such communication.

In at least one example, the example environment 1100 can enable contactless payments, via integration of peer-to-peer payment, or other payment making, platform(s) and payment processing platform(s), are described herein. For the purpose of FIG. 11, the environment 800 can refer to a payment processing platform and the environment 900 can refer to a peer-to-peer payment, or payment making, platform. In an example, such an integration can enable a customer to participate in a transaction via their own computing device instead of interacting with a merchant device of a merchant, such as the merchant device 808(A). In such an example, the POS application 818, associated with a payment processing platform and executable by the merchant device 808(A) of the merchant, can present a Quick Response (QR) code, or other code that can be used to identify a transaction (e.g., a transaction code), in association with a transaction between the customer and the merchant. The QR code, or other transaction code, can be provided to the POS application 818 via an API associated with the peer-to-peer payment platform. In an example, the customer can utilize their own computing device, such as the user device 908(A), to capture the QR code, or the other transaction code, and to provide an indication of the captured QR code, or other transaction code, to server(s) 802 and/or server(s) 902.

Based at least in part on the integration of the peer-to-peer payment platform and the payment processing platform (e.g., via the API), the server(s) 802 and/or 902 associated with each can exchange communications with each other—and with a payment application 918 associated with the peer-to-peer payment platform and/or the POS application 818—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 908(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 908(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 818 and the payment application 918, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 908(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 818, associated with a payment processing platform, on the merchant device 808(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 808(A) can present a QR code, or other transaction code, that can be associated with a peer-to-peer payment platform. The customer can use a camera associated with the user device 908(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 818, associated with a payment processing platform, on the merchant device 808(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 818 can cause a text message with a resource locator (e.g., uniform resource locator (URL)) that can be associated with a peer-to-peer payment platform to be sent to the user device 908(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction—between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 908(A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 818 of a merchant device 808(A) at a brick-and-mortar store of a merchant to a payment application 918 of a user device 908(A) of a customer to enable the customer to participate in a transaction via their own computing device. For instance, in a "scan to pay" example as described above, based at least in part on capturing the QR code, or other transaction code, via the user device 908(A), the payment processing platform can provide transaction data to the peer-to-peer payment platform for presentation via the payment application 918 on the user device 908(A). In some examples, the customer can watch items being added to their cart (e.g., via a user interface presented via the payment application). As an item is added to a virtual cart by the merchant—via the POS application 818 on the merchant device 808(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 918 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 908(A) during or after payment of the transaction.

In some examples, based at least in part on capturing the QR code, or other transaction code, the payment processing platform can provide transaction data to the peer-to-peer payment platform for presentation via the payment application 918 on the computing device of the customer, such as the user device 908(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 918 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 818, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 918 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 12:
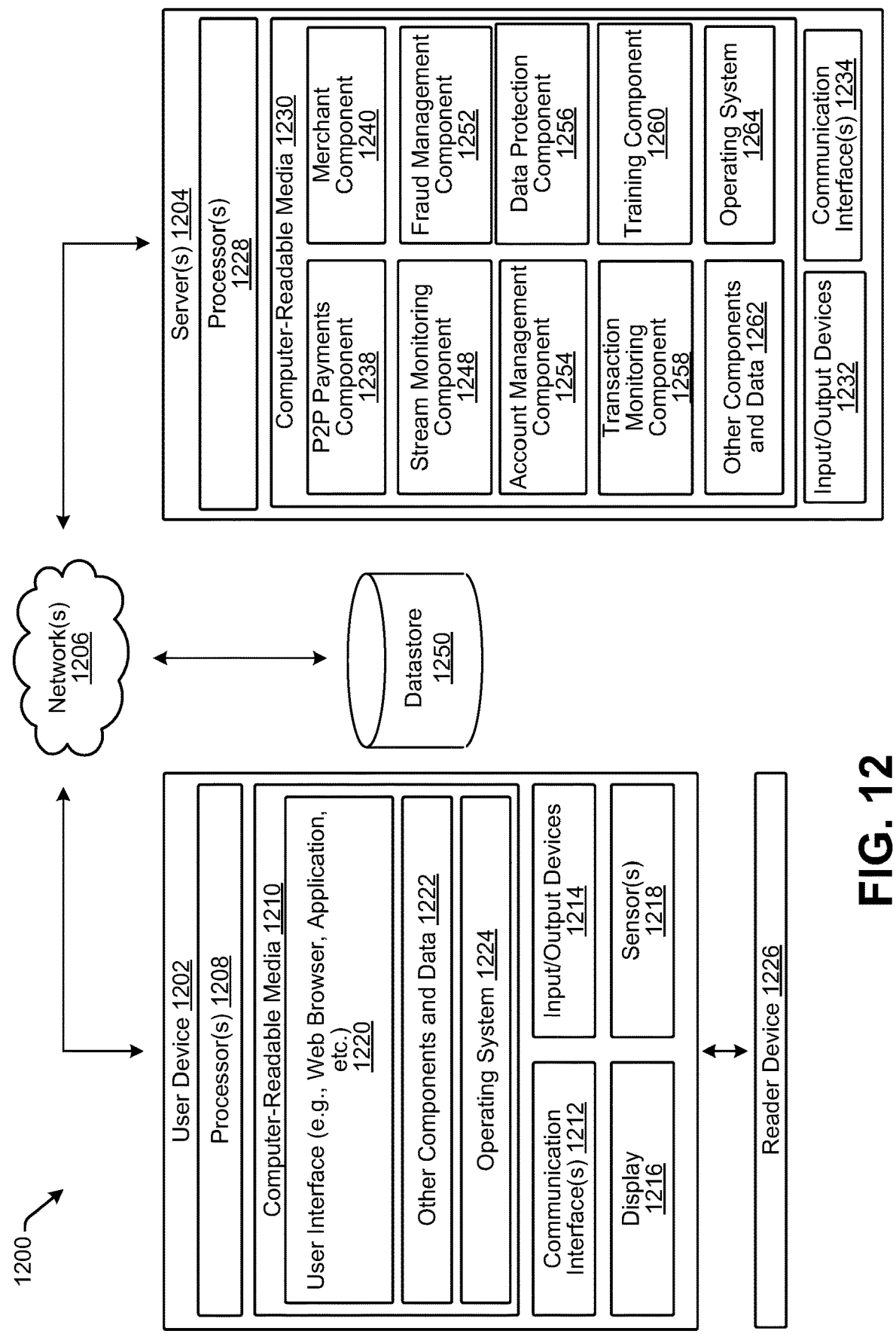
FIG. 12 illustrates an example computer system for providing embodiments described herein.

FIG. 12 depicts an illustrative block diagram illustrating a system 1200 for performing techniques described herein. The system 1200 includes a user device 1202, that communicates with server computing device(s) (e.g., server(s) 1204) via network(s) 1206 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1202 is illustrated, in additional or alternate examples, the system 1200 can have multiple user devices, as described above with reference to FIG. 8.

Certain elements of environment 100 described with respect to FIG. 1 correspond to similar elements described herein with respect to FIG. 12. For example, the server(s) 1204 can correspond to server(s) 104, the network(s) 1206 can correspond to the network(s) 108, the user device(s) 1202 can correspond to any of the user device(s) 112, the datastore 1250 can correspond to datastore 128, etc.

Similar to server(s) 104, servers 1204 can store one or more functional components that enable the payment service to perform operations as described herein. For example, the server(s) 1204 can store a stream monitoring component 1248 that can correspond to stream monitoring component 117, a fraud management component 1252 that can correspond to fraud management component 119, an account management component 1254 that can correspond to account management component 121, and a transaction monitoring component 1258 that can correspond to a transaction monitoring component 123. Each component can function similarly to the respective components described in FIG. 1.

In at least one example, the user device 1202 can be any suitable type of computing device, e.g., portable, semi-portable, semi-stationary, or stationary. Some examples of the user device 1202 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1202 can be any computing device capable of sending communications and performing the functions according to the techniques described herein. The user device 1202 can include devices, e.g., payment card readers, or components capable of accepting payments, as described below.

In the illustrated example, the user device 1202 includes one or more processors 1208, one or more computer-readable media 1210, one or more communication interface(s) 1212, one or more input/output (I/O) devices 1214, a display 1216, and sensor(s) 1218.

In at least one example, each processor 1208 can itself comprise one or more processors or processing cores. For example, the processor(s) 1208 can be implemented as one or more microprocessors, microcomputers, microcontrollers, digital signal processors, central processing units, state machines, logic circuitries, and/or any devices that manipulate signals based on operational instructions. In some examples, the processor(s) 1208 can be one or more hardware processors and/or logic circuits of any suitable type specifically programmed or configured to execute the algorithms and processes described herein. The processor(s) 1208 can be configured to fetch and execute computer-readable processor-executable instructions stored in the computer-readable media 1210.

Depending on the configuration of the user device 1202, the computer-readable media 1210 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1210 can include, but is not limited to, RAM, ROM, EEPROM, flash memory, solid-state storage, magnetic disk storage, optical storage, and/or other computer-readable media technology. Further, in some examples, the user device 1202 can access external storage, such as RAID storage systems, storage arrays, network attached storage, storage area networks, cloud storage, or any other medium that can be used to store information and that can be accessed by the processor(s) 1208 directly or through another computing device or network. Accordingly, the computer-readable media 1210 can be computer storage media able to store instructions, components or components that can be executed by the processor(s) 1208. Further, when mentioned, non-transitory computer-readable media exclude media such as energy, carrier signals, electromagnetic waves, and signals per se.

The computer-readable media 1210 can be used to store and maintain any number of functional components that are executable by the processor(s) 1208. In some implementations, these functional components comprise instructions or programs that are executable by the processor(s) 1208 and that, when executed, implement operational logic for performing the actions and services attributed above to the user device 1202. Functional components stored in the computer-readable media 1210 can include a user interface 1220 to enable users to interact with the user device 1202, and thus the server(s) 1204 and/or other networked devices. In at least one example, the user interface 1220 can be presented via a web browser, or the like. In other examples, the user interface 1220 can be presented via an application, such as a mobile application or desktop application, which can be provided by a service provider associated with the server(s) 1204, or which can be an otherwise dedicated application. In some examples, the user interface 1220 can be FIGS. 2A-3. In at least one example, a user can interact with the user interface via touch input, spoken input, gesture, or any other type of input. The word "input" is also used to describe "contextual" input that may not be directly provided by the user via the user interface 1220. For example, user's interactions with the user interface 1220 are analyzed using, e.g., natural language processing techniques, to determine context or intent of the user, which may be treated in a manner similar to "direct" user input.

Depending on the type of the user device 1202, the computer-readable media 1210 can also optionally include other functional components and data, such as other components and data 1222, which can include programs, drivers, etc., and the data used or generated by the functional components. In addition, the computer-readable media 1210 can also store data, data structures and the like, that are used by the functional components. Further, the user device 1202 can include many other logical, programmatic and physical components, of which those described are merely examples that are related to the discussion herein.

In at least one example, the computer-readable media 1210 can include additional functional components, such as an operating system 1224 for controlling and managing various functions of the user device 1202 and for enabling basic user interactions.

The communication interface(s) 1212 can include one or more interfaces and hardware components for enabling communication with various other devices, such as over the network(s) 1206 or directly. For example, communication interface(s) 1212 can enable communication through one or more network(s) 1206, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1202 can further include one or more input/output (I/O) devices 1214. The I/O devices 1214 can include speakers, a microphone, a camera, and various user controls (e.g., buttons, a joystick, a keyboard, a keypad, etc.), a haptic output device, and so forth. The I/O devices 1214 can also include attachments that leverage the accessories (audio-jack, USB-C. Bluetooth, etc.) to connect with the user device 1202.

In at least one example, user device 1202 can include a display 1216. Depending on the type of computing device(s) used as the user device 1202, the display 1216 can employ any suitable display technology. For example, the display 1216 can be a liquid crystal display, a plasma display, a light emitting diode display, an OLED (organic light-emitting diode) display, an electronic paper display, or any other suitable type of display able to present digital content thereon. In at least one example, the display 1216 can be an augmented reality display, a virtually reality display, or any other display able to present and/or project digital content. In some examples, the display 1216 can have a touch sensor associated with the display 1216 to provide a touchscreen display configured to receive touch inputs for enabling interaction with a graphic interface presented on the display 1216. Accordingly, implementations herein are not limited to any particular display technology. Alternatively, in some examples, the user device 1202 may not include the display 1216, and information can be presented by other means, such as aurally, haptically, etc.

In addition, the user device 1202 can include sensor(s) 1218. The sensor(s) 1218 can include a GPS device able to indicate location information. Further, the sensor(s) 1218 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users and/or for sending users notifications regarding available appointments with merchant(s) located proximate to the users. In at least one example, location can be used for taking payments from nearby customers when they leave a geofence, or location can be used to initiate an action responsive to users 614 enter a brick-and-mortar store of a merchant. Location can be used in additional or alternative ways as well.

Additionally, the user device 1202 can include various other components that are not shown, examples of which include removable storage, a power source, such as a battery and power control unit, a barcode scanner, a printer, a cash drawer, and so forth.

In addition, in some examples, the user device 1202 can include, be connectable to, or otherwise be coupled to a reader device 1226, for reading payment instruments and/or identifiers associated with payment objects. In some examples, as described above, the reader device 1226 can plug in to a port in the user device 1202, such as a microphone port, a headphone port, an audio-jack, a data port, or other suitable port. In additional or alternative examples, the reader device 1226 can be coupled to the user device 1202 via another wired or wireless connection, such as via a Bluetooth®, BLE, and so on. The reader device 1226 can include a read head for reading a magnetic strip of a payment card, and further can include encryption technology for encrypting the information read from the magnetic strip. Additionally or alternatively, the reader device 1226 can be an EMV payment reader, which in some examples, can be embedded in the user device 1202. Moreover, numerous other types of readers can be employed with the user device 1202 herein, depending on the type and configuration of the user device 1202.

The reader device 1226 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1226 may include hardware implementation, such as slots, magnetic tracks, and rails with one or more sensors or electrical contacts to facilitate detection and acceptance of a payment instrument. That is, the reader device 1226 may include hardware implementations to enable the reader device 1226 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1226 may also include a biometric sensor to receive and process biometric characteristics and process them as payment instruments, given that such biometric characteristics are registered with the payment service and connected to a financial account with a bank server.

The reader device 1226 may include processing unit(s), computer-readable media, a reader chip, a transaction chip, a timer, a clock, a network interface, a power supply, and so on. The processing unit(s) of the reader device 1226 may execute one or more components and/or processes to cause the reader device 1226 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1226, the computer-readable media may include volatile memory (such as RAM), nonvolatile memory (such as ROM, flash memory, miniature hard drive, memory card, or the like), or some combination thereof. In at least one example, the computer-readable media of the reader device 1226 may include at least one component for performing various functions as described herein.

The reader chip may perform functionalities to control the operations and processing of the reader device 1226. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1206, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1226. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1202, which can be a POS terminal, and the reader device 1226 are shown as separate devices, in additional or alternative examples, the user device 1202 and the reader device 1226 can be part of a single device, which may be a battery-operated device. In such an example, components of both the user device 1202 and the reader device 1226 may be associated with the single device. In some examples, the reader device 1226 can have a display integrated therewith, which can be in addition to (or as an alternative of) the display 1216 associated with the user device 1202.

The server(s) 1204 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1204 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1204 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1204 can include one or more processors 1228, one or more computer-readable media 1230, one or more I/O devices 1232, and one or more communication interfaces 1234. Each processor 1228 can be a single processing unit or a number of processing units, and can include single or multiple computing units or multiple processing cores. The processor(s) 1228 can be implemented as one or more microprocessors, microcomputers, microcontrollers, digital signal processors, central processing units, state machines, logic circuitries, and/or any devices that manipulate signals based on operational instructions. For example, the processor(s) 1228 can be one or more hardware processors and/or logic circuits of any suitable type specifically programmed or configured to execute the algorithms and processes described herein. The processor(s) 1228 can be configured to fetch and execute computer-readable instructions stored in the computer-readable media 1230, which can program the processor(s) 1228 to perform the functions described herein.

The computer-readable media 1230 can include volatile and nonvolatile memory and/or removable and non-removable media implemented in any type of technology for storage of information, such as computer-readable instructions, data structures, program components, or other data. Such computer-readable media 1230 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1204, the computer-readable media 1230 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1230 can be used to store any number of functional components that are executable by the processor(s) 1228. In many implementations, these functional components comprise instructions or programs that are executable by the processors 1228 and that, when executed, specifically configure the one or more processors 1228 to perform the actions attributed above to the service provider and/or payment processing service. Functional components stored in the computer-readable media 1230 can optionally include a merchant component 1236, a training component 1238, and one or more other components and data 1240.

The merchant component 1236 can be configured to receive transaction data from POS systems, such as the POS system 624 described above with reference to FIG. 6. The merchant component 1236 can transmit requests (e.g., authorization, capture, settlement, etc.) to payment service server computing device(s) to facilitate POS transactions between merchants and customers. The merchant component 1236 can communicate the successes or failures of the POS transactions to the POS systems.

The training component 1238 can be configured to train models using machine-learning mechanisms. For example, a machine-learning mechanism can analyze training data to train a data model that generates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a datastore associated with the user device(s) 1202 and/or the server(s) 1204 for use at a time after the data models have been trained (e.g., at runtime).

The one or more other components and data 1240 can include a stream monitoring component 1248, a fraud management component 1252, an account management component 1254, a data protection component 1256, a transaction monitoring component 1258, a training component 1260, other components and data 1262, or the like, the functionality of which is described, at least partially, above. Further, the one or more other components and data 1240 can include programs, drivers, etc., and the data used or generated by the functional components. Further, the server(s) 1204 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or nonvolatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1230 can additionally include an operating system 1242 for controlling and managing various functions of the server(s) 1204.

The communication interface(s) 1234 can include one or more interfaces and hardware components for enabling communication with various other devices, such as over the network(s) 1206 or directly. For example, communication interface(s) 1234 can enable communication through one or more network(s) 1206, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1206 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1204 can further be equipped with various I/O devices 1232. Such I/O devices 1232 can include a display, various user interface controls (e.g., buttons, joystick, keyboard, mouse, touch screen, biometric or sensory input devices, etc.), audio speakers, connection ports and so forth.

In at least one example, the system 1200 can include a datastore 1244 that can be configured to store data that is accessible, manageable, and updatable. In some examples, the datastore 1244 can be integrated with the user device 1202 and/or the server(s) 1204. In other examples, as shown in FIG. 12, the datastore 1244 can be located remotely from the server(s) 1204 and can be accessible to the server(s) 1204. The datastore 1244 can comprise multiple databases and/or servers connected locally and/or remotely via the network(s) 1206.

In at least one example, the datastore 1244 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

Furthermore, in at least one example, the datastore 1244 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1244 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and case of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Also disclosed are the following clauses:

1. A computer-implemented method comprising, by one or more computing systems of a payment service:
    monitoring a plurality of real-time streams of digital broadcast content;
    monitoring a plurality of cryptocurrency transactions in real-time;
    determining, using a machine-learning model trained to detect fraudulent cryptocurrency transaction activity, that one or more of the real-time streams correspond to fraudulent cryptocurrency transaction activity, the fraudulent cryptocurrency transaction activity comprising one or more fraudulent cryptocurrency transactions each associated with a destination address, wherein the machine-learning model is provided input corresponding to the monitored real-time streams and plurality of cryptocurrency transactions;
    flagging the one or more destination addresses associated with the fraudulent cryptocurrency activity as suspicious addresses;
    receiving, from a user device of a first user, a request to initiate a cryptocurrency transaction on behalf of the first user, the cryptocurrency transaction identifying a requested destination address;
    determining that the requested destination address has been flagged as a suspicious address;
    delaying the requested cryptocurrency transaction at least until a confirmation from the first user has been received; and
    causing a user intervention to be displayed by the user device of the first user while the transaction is delayed.

2. The method of clause 1, further comprising:
in response to the user intervention and prior to receiving the confirmation from the first user, receiving a user input from the user device of the first user to cancel the requested cryptocurrency transaction; and
preventing execution of the requested cryptocurrency transaction in response to receiving the user input.

3. The method of any of clauses 1-2, wherein the user intervention comprises a presentation of evidence that the requested destination address is a suspicious address, the evidence comprising the fraudulent cryptocurrency transaction activity associated with the requested destination address.

4. The method of any of clauses 1-3, wherein the input corresponding to the monitored real-time streams and plurality of cryptocurrency transactions comprises:
a determination from a content monitoring algorithm of whether the digital broadcast content of a real-time stream of the plurality of real-time streams is inauthentic or misrepresented;
an account identifier associated with a real-time stream of the plurality of real-time streams;
an association between a real-time stream of the plurality of real-time streams and a destination address associated with a cryptocurrency transaction of the plurality of cryptocurrency transactions; or
a number of inbound transactions to a destination address associated with a real-time stream of the plurality of real-time streams.

5. A computer-implemented method comprising:
monitoring a plurality of real-time streams of content;
monitoring a plurality of transactions in real-time;
determining, using a machine-learning model trained to detect fraudulent transaction activity, that one or more of the real-time streams are associated with fraudulent transaction activity based on input corresponding to the monitored real-time streams and plurality of transactions;
receiving, from a user device of a first user, a request to initiate a transaction on behalf of the first user;
determining that a characteristic of the requested transaction is indicative of a fraudulent transaction associated with the fraudulent transaction activity associated with one or more of the real-time streams; and
modifying processing of the requested transaction in response to determining that the characteristic of the requested transaction is indicative of the fraudulent transaction.

6. The method of clause 5, further comprising
generating a training set of data for the machine-learning model to detect fraudulent transaction activity by converting input data for the training set to a file of a self-destructing file format, wherein files of the self-destructing file format are configured to automatically render themselves unusable after a predetermined period of time has elapsed or a predetermined number of uses, wherein the input data comprises an identity of a respective user associated with a plurality of transactions; and
training the machine-learning model to detect fraudulent transaction activity using the training set of data.

7. The method of clause 6, wherein the files of the self-destructing file format are configured to render themselves unusable by automatically deleting themselves from a local file system of a computing system storing the files of the self-destructing file format.

8. The method of any of clauses 5-7, wherein modifying processing of the requested transaction comprises:
causing a user intervention to be displayed by the user device of the first user, wherein the requested transaction is prevented from processing while the user intervention is displayed;
receiving a user input from the user device of the first user comprising a request to cancel the requested transaction in response to the user intervention; and
canceling the requested transaction in response to receiving the user input.

9. The method of any of clauses 5-8, wherein modifying processing of the requested transaction comprises:
generating an alternative destination address for the requested transaction, wherein the alternative destination address is different from a requested destination address identified in the request to initiate the transaction, wherein the alternative destination address is associated with an account to temporarily hold funds associated with the transaction; and
processing the requested transaction using the alternative destination address.

10. The method of clause 9, further comprising:
receiving a user input from the user device of the first user comprising a confirmation of the requested transaction; and
facilitating a transfer of funds from the alternative destination address to the destination address based on the transaction.

11. The method of any of clauses 5-10, wherein the input corresponding to the monitored real-time streams and plurality of transactions comprises one or more received user queries associating one of the one or more real-time streams with a destination address or reporting fraudulent activity corresponding to the monitored real-time streams or destination address.

12. The method of any of clauses 5-11, further comprising:
receiving input from a user device of a user associated with the one or more of the real-time streams, the input verifying authenticity of the one or more of the real-time streams;
modifying the determination from the machine-learning model, that the one or more of the real-time streams is associated with fraudulent activity; and
processing a subsequent requested transaction associated with the real-time stream based on the modified determination and input verifying the authenticity of the one or more of the real-time streams.

13. The method of any of clauses 5-12, further comprising:
receiving input from a user device of a user associated with a destination address associated with the requested transaction;
verifying authenticity of the requested transaction based on the received input; and
processing the requested transaction in response to verifying the authenticity of the requested transaction.

14. The method of clause 13, wherein:
the input from the user device of the user associated with the destination address comprises information to verify an identity of the user associated with the destination address,
verifying the authenticity of the requested transaction comprises verifying the identity of the user using a second machine-learning model trained to verify the authenticity of information provided to verify identities of users, the information to verify the identity of the user associated with the destination address is stored in a local file system of a computing system executing the second machine-learning model as a file of a self-destructing file format, and files of the self-destructing file format are configured to automatically render themselves unusable after a predetermined period of time has elapsed or a predetermined number of uses.

15. A payment service system comprising:
one or more processors; and
one or more computer-readable non-transitory storage media coupled to one or more of the processors and comprising instructions operable when executed by one or more of the processors to cause the payment service system to perform operations comprising:
monitor a plurality of real-time streams of content;
monitor a plurality of transactions in real-time;
determine, using a machine-learning model trained to detect fraudulent transaction activity, that one or more of the real-time streams are associated with fraudulent transaction activity based on input corresponding to the monitored real-time streams and plurality of transactions;
receive, from a user device of a first user, a request to initiate a transaction on behalf of the first user;
determine that a characteristic of the requested transaction is indicative of a fraudulent transaction associated with the fraudulent transaction activity associated with one or more of the real-time streams; and
modify processing of the requested transaction in response to determining that the characteristic of the requested transaction is indicative of the fraudulent transaction.

16. The system of clause 15, wherein the instructions are further operable when executed by one or more of the processors to cause the payment service system to perform further operations comprising:
generate a training set of data for the machine-learning model to detect fraudulent transaction activity by converting input data for the training set to a file of a self-destructing file format, wherein files of the self-destructing file format are configured to automatically render themselves unusable after a predetermined period of time has elapsed or a predetermined number of uses, wherein the input data comprises an identity of a respective user associated with a plurality of transactions; and
train the machine-learning model to detect fraudulent transaction activity using the training set of data.

17. The system of clause 16, wherein the files of the self-destructing file format are configured to render themselves unusable by automatically deleting themselves from a local file system of a computing system storing the files of the self-destructing file format.

18. The system of any of clauses 15-17, wherein the instructions are further operable when executed by one or more of the processors to cause the payment service system to perform further operations comprising:
cause a user intervention to be displayed by the user device of the first user, wherein the requested transaction is prevented from processing while the user intervention is displayed;
receive a user input from the user device of the first user comprising a request to cancel the requested transaction in response to the user intervention; and
cancel the requested transaction in response to receiving the user input.

19. The system of any of clauses 15-18, wherein the instructions are further operable when executed by one or more of the processors to cause the payment service system to perform further operations comprising:
generate an alternative destination address for the requested transaction, wherein the alternative destination address is different from a requested destination address identified in the request to initiate the transaction, wherein the alternative destination address is associated with an account to temporarily hold funds associated with the transaction; and
process the requested transaction using the alternative destination address.

20. The system of any of clauses 15-19, wherein the instructions are further operable when executed by one or more of the processors to cause the payment service system to perform further operations comprising:
receive a user input from the user device of the first user comprising a confirmation of the requested transaction; and
facilitate a transfer of funds from the alternative destination address to the destination address based on the transaction.

What is claimed is:
1. A computer-implemented method comprising:
monitoring a plurality of real-time streams of content;
monitoring a plurality of transactions in real-time;
determining, using a machine-learning model trained to detect fraudulent transaction activity, that one or more of the plurality of real-time streams are associated with fraudulent transaction activity based on input corresponding to the monitored plurality of real-time streams and the plurality of transactions;
receiving, from a first user device of a first user, a request to initiate a requested transaction on behalf of the first user;
determining that a characteristic of the requested transaction is indicative of a fraudulent transaction associated with the fraudulent transaction activity associated with one or more of the plurality of real-time streams;
preventing execution of the requested transaction in response to determining that the characteristic of the requested transaction is indicative of the fraudulent transaction by generating an alternative destination address for the requested transaction, wherein the alternative destination address is different from a requested destination address identified in the request to initiate the requested transaction, wherein the requested destination address is associated with a first account, and wherein the alternative destination address is associated with a second account, different from the first account, to temporarily hold funds associated with the requested transaction;
processing real-time identity verification of the first account associated with the requested destination address;
responsive to determining that the first account is not verified, returning the funds associated with the requested transaction to the first user device; and
responsive to determining that the first account is verified, processing the requested transaction and sending the funds associated with the requested transaction to the requested destination address associated with the first account.

2. The method of claim 1, further comprising
generating a training set of data for the machine-learning model to detect fraudulent transaction activity by converting input data for the training set to a file of a self-destructing file format, wherein files of the self-destructing file format are configured to automatically render themselves unusable after a predetermined period of time has elapsed or a predetermined number of uses, wherein the input data comprises an identity of a respective user associated with a plurality of training transactions; and
training the machine-learning model to detect fraudulent transaction activity using the training set of data.

3. The method of claim 2, wherein the files of the self-destructing file format are configured to render themselves unusable by automatically deleting themselves from a local file system of a computing system storing the files of the self-destructing file format.

4. The method of claim 1, wherein preventing execution of the requested transaction further comprises:
causing a user intervention to be displayed by the first user device of the first user, wherein the requested transaction is prevented from execution while the user intervention is displayed;
receiving a user input from the first user device of the first user comprising a request to cancel the requested transaction in response to the user intervention; and
canceling the requested transaction in response to receiving the user input.

5. The method of claim 1, further comprising:
receiving input from a second user device of a second user associated with the one or more of the plurality of real-time streams, the input verifying authenticity of the one or more of the plurality of real-time streams; and
holding the requested transaction using the alternative destination address responsive to the input until processing real-time identity verification is complete.

6. The method of claim 1, further comprising:
receiving a user input from the first user device of the first user comprising a confirmation of the requested transaction; and
facilitating a transfer of funds from the alternative destination address to the requested destination address based on the requested transaction.

7. The method of claim 1, wherein the input corresponding to the plurality of real-time streams and the plurality of transactions comprises one or more received user queries associating one of the one or more of the plurality of real-time streams with a destination address or reporting fraudulent activity corresponding to the plurality of real-time streams or the requested destination address.

8. The method of claim 1, further comprising:
receiving input from a second user device of a second user associated with the one or more of the plurality of real-time streams, the input verifying authenticity of the one or more of the plurality of real-time streams;
modifying the determination from the machine-learning model, that the one or more of the plurality of real-time streams is associated with fraudulent activity; and
processing a subsequent requested transaction associated with an associated real-time stream based on the modified determination and the input verifying the authenticity of the one or more of the plurality of real-time streams.

9. The method of claim 1, wherein processing real-time identity verification of the first account associated with the requested destination address comprises:
receiving input from a second user device of a second user associated with the requested destination address associated with the requested transaction; and
verifying authenticity of the requested transaction based on the received input.

10. The method of claim 9, wherein:
the input from the second user device of the user associated with the requested destination address comprises information to verify an identity of the second user associated with the destination address,
verifying the authenticity of the requested transaction comprises verifying the identity of the user using a second machine-learning model trained to verify the authenticity of information provided to verify identities of users,
the information to verify the identity of the user associated with the requested destination address is stored in a local file system of a computing system executing the second machine-learning model as a file of a self-destructing file format, and
files of the self-destructing file format are configured to automatically render themselves unusable after a predetermined period of time has elapsed or a predetermined number of uses.

11. A payment service system comprising:
one or more processors; and
one or more computer-readable non-transitory storage media coupled to one or more of the processors and comprising instructions operable when executed by one or more of the processors to cause the payment service system to perform operations comprising:
monitor a plurality of real-time streams of content;
monitor a plurality of transactions in real-time;
determine, using a machine-learning model trained to detect fraudulent transaction activity, that one or more of the plurality of real-time streams are associated with fraudulent transaction activity based on input corresponding to the monitored plurality of real-time streams and the plurality of transactions;
receive, from a user device of a first user, a request to initiate a requested transaction on behalf of the first user;
determine that a characteristic of the requested transaction is indicative of a fraudulent transaction associated with the fraudulent transaction activity associated with one or more of the plurality of real-time streams;
prevent execution of the requested transaction in response to determining that the characteristic of the requested transaction is indicative of the fraudulent transaction by generating an alternative destination address for the requested transaction, wherein the alternative destination address is different from a requested destination address identified in the request to initiate the requested transaction, wherein the requested destination address is associated with a first account, and wherein the alternative destination address is associated with a second account, different from the first account, to temporarily hold funds associated with the requested transaction;
process real-time identity verification of the first account associated with the requested destination address;

responsive to determining that the first account is not verified, return the funds associated with the requested transaction to the user device; and responsive to determining that the first account is verified, process the requested transaction and sending the funds associated with the requested transaction to the requested destination address associated with the first account.

12. The system of claim 11, wherein the instructions are further operable when executed by one or more of the processors to cause the payment service system to perform further operations comprising:

generate a training set of data for the machine-learning model to detect fraudulent transaction activity by converting input data for the training set to a file of a self-destructing file format, wherein files of the self-destructing file format are configured to automatically render themselves unusable after a predetermined period of time has elapsed or a predetermined number of uses, wherein the input data comprises an identity of a respective user associated with a plurality of training transactions; and train the machine-learning model to detect fraudulent transaction activity using the training set of data.

13. The system of claim 12, wherein the files of the self-destructing file format are configured to render themselves unusable by automatically deleting themselves from a local file system of a computing system storing the files of the self-destructing file format.

14. The system of claim 11, wherein the instructions are further operable when executed by one or more of the processors to cause the payment service system to perform further operations comprising:

cause a user intervention to be displayed by the user device of the first user, wherein the requested transaction is prevented from processing while the user intervention is displayed;

receive a user input from the user device of the first user comprising a request to cancel the requested transaction in response to the user intervention; and cancel the requested transaction in response to receiving the user input.

15. The system of claim 11, wherein the instructions are further operable when executed by one or more of the processors to cause the payment service system to perform further operations comprising:

process the requested transaction using the alternative destination address.

16. The system of claim 15, wherein the instructions are further operable when executed by one or more of the processors to cause the payment service system to:

receive a user input from the user device of the first user comprising a confirmation of the requested transaction; and facilitate a transfer of the funds from the alternative destination address to the destination address based on the requested transaction.

* * * * *